(12) United States Patent
Shiraishi

(10) Patent No.: US 7,649,663 B2
(45) Date of Patent: Jan. 19, 2010

(54) OPTICAL BEAM SCANNING DEVICE RESTRAINING BEAM POSITION ERROR DUE TO TEMPERATURE CHANGE WITH DIFFRACTION GRATING AND IMAGE FORMING APPARATUS USING THE SAME

(75) Inventor: Takashi Shiraishi, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/773,495

(22) Filed: Jul. 5, 2007

(65) Prior Publication Data

US 2009/0009839 A1   Jan. 8, 2009

(51) Int. Cl.
*G02B 26/08* (2006.01)

(52) U.S. Cl. .................. 359/204.1; 359/205.1; 347/243

(58) Field of Classification Search ...... 359/196–226.3; 347/233, 241, 243–244, 256, 258–261
See application file for complete search history.

(56) References Cited

U.S. PATENT DOCUMENTS

| 5,715,078 A | * | 2/1998 | Shiraishi | ............ | 359/204 |
| 6,038,053 A | * | 3/2000 | Kato | ............ | 359/205 |
| 6,493,126 B1 | * | 12/2002 | Iizuka | ............ | 359/205 |

FOREIGN PATENT DOCUMENTS

| JP | 2002-221681 | 8/2002 |
| JP | 2005-221870 | 8/2005 |
| JP | 2006-171117 | 6/2006 |

* cited by examiner

*Primary Examiner*—Stephone B Allen
*Assistant Examiner*—Jennifer L. Doak
(74) *Attorney, Agent, or Firm*—Turocy & Watson, LLP

(57) ABSTRACT

A technique is provided which enables proper correction of optical characteristics in accordance with change in ambient temperature.

An optical beam scanning device capable of causing a luminous flux from a light source to scan a photoconductive surface of each of plural photoconductors in a main scanning direction, includes: a polygon mirror 80 which reflects and deflects an incident luminous flux by plural reflection surfaces arrayed in a direction of rotation, and thereby causes the incident luminous flux to scan in the main scanning direction; and a post-deflection optical system A which includes plural optical devices and which guides the luminous flux reflected and deflected by each of the plural reflection surfaces in the polygon mirror 80, to a photoconductive surface of a photoconductor to which the luminous flux should be guided. Of the plural optical devices forming the post-deflection optical system A, in at least one optical device on which a principal ray of the luminous flux which should be guided to each of the plural photoconductors becomes incident at different incident positions from each other in a sub scanning direction orthogonal to the main scanning direction, a diffraction grating is formed at least on one of an incident surface and an exit surface of the luminous flux in the optical device.

20 Claims, 49 Drawing Sheets

FIG.9

$$x = \frac{cuy \times y^2 + cuz \times z^2}{1 + \sqrt{1 - ay \times cuy^2 \times y^2 - az \times cuz^2 \times z^2}} + \sum a_{lm} \times y^l \times z^m$$

LENS SURFACE SHAPE DEFINING FORM

FIG.10

DIAMETER OF INSCRIBED CIRCLE OF POLYGON MIRROR  40.0

POSITION OF ROTATION CENTER OF POLYGON MIRROR  X 17.2  Y 10.1
(POSITION AS VIEWED FROM LOCAL COORDINATE SYSTEM OF POLYGON REFLECTION SURFACE)

IMAGE FORMING POSITION OF FINITE LENS

| | RAY1 | RAY2 | RAY3 | RAY4 |
|---|---|---|---|---|
| | 3994.7 | 3092.7 | 3247.3 | 4039.2 |

| | SURFACE NO. | CURVATURE | | | TH | | | | | REFRACTIVE INDEX N | NOTES |
|---|---|---|---|---|---|---|---|---|---|---|---|
| | | MAIN SCAN cuy | SUB SCAN cuz | COMMON | COMMON | RAY1 | RAY2 | RAY3 | RAY4 | | |
| PRE-DEFLECTION OPTICAL SYSTEM | 1 | 0 | 0.0183 | 5.0 | | 33.3 | 33.3 | 33.3 | 33.3 | | |
| | 2 | | | | | -0.1 | -0.7 | -1.0 | -0.1 | 1.511 | |
| | 3 | | | 67.9 | | | | | | | |
| | 4 | | | 10.0 | | | | | | | |
| | 5 | | | 14.3 | | | | | | 1.511 | |
| | 6 | | | 2.0 | | | | | | | |
| | 7 | | | 11.1 | | | | | | 1.511 | |
| | 8 | | | | | | | | | | |
| | 9 | | | -6.8 | | | | | | | DEFLECTION SURFACE |
| | 10 | | | -2.0 | | | | | | | |
| | 11 | | | -25.3 | | | | | | -1.511 | |
| POST-DEFLECTION OPTICAL SYSTEM | 12 | 0.01689 | -0.0728 | -5.6 | | | | | | -1.503 | PLASTIC LENS.CURVED SURFACE POLYNOMIAL COEFFICIENT : TABLE 1 |
| | 13 | 0.02139 | 0.05224 | -129.7 | | | | | | | PLASTIC LENS.CURVED SURFACE POLYNOMIAL COEFFICIENT : TABLE 2 |
| | 14 | 0.00097 | -0.0144 | -5.9 | | | | | | -1.503 | PLASTIC LENS.CURVED SURFACE POLYNOMIAL COEFFICIENT : TABLE 3 |
| | 15 | 0.00239 | 0.00916 | -131.5 | | | | | | | PLASTIC LENS.CURVED SURFACE POLYNOMIAL COEFFICIENT : TABLE 4 |
| | 16 | | | -2.0 | | -0.2 | 0.0 | -0.1 | -0.2 | -1.511 | |
| | 17 | | | | | | | | | | |
| | 18 | | | -83.0 | | | | | | | |

GLASS (BK7) : 1.511
PLASTIC LENS : 1.503

REFRACTIVE INDEX AFTER REFLECTION, DISTANCE BETWEEN SURFACES AND SHAPE DATA HAVE NEGATIVE SIGN (-) ADDED THERETO
LENS SURFACE SHAPE WITH CURVED SURFACE POLYNOMIAL COEFFICIENT DATA IS EXPRESSED BY THE FOLLOWING EQUATION $$x=(cuy*y^2+cuz*z^2)/(1+Sqrt(1-ay*cuy^2*y^2-az*cuz^2*z^2))+\Sigma a_{lm}*y^l*z^m \text{ IN THIS EXAMPLE}, ay=1, az=1$$

y DIRECTION: MAIN SCANNING DIRECTION, z DIRECTION: SUB SCANNING DIRECTION, x DIRECTION: DIRECTION OF OPTICAL AXIS (+ SIDE IN EACH LOCAL COORDINATE SYSTEM
OF PRE-DEFLECTION OPTICAL SYSTEM AND - SIDE IN EACH LOCAL COORDINATE SYSTEM OF POST-DEFLECTION OPTICAL SYSTEM

FIG.11

PARAXIAL POWER OF fθ2 PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | -1.685E-02 | -2.136E-02 | -8.48E-03 | 1.08E-02 | 3.7247 | 0.002608469 | 1.56796E-05 |
| SUB SCAN | -3.100E-02 | -6.931E-02 | -1.56E-02 | 3.49E-02 | 3.7247 | 0.021317075 | 0.000128138 |

PARAXIAL POWER OF fθ2 PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | -9.108E-04 | -9.395E-04 | -4.59E-04 | 4.73E-04 | 3.92424 | 1.53324E-05 | 9.21636E-08 |
| SUB SCAN | 1.313E-02 | -8.333E-04 | 6.61E-03 | 4.20E-04 | 3.92424 | 0.007017479 | 4.21823E-05 |

| | DIFFRACTION SURFACE POWER | | $\phi/\nu$ | $\Sigma \phi/\nu$ |
|---|---|---|---|---|
| | INCIDENT SURFACE | EXIT SURFACE | | |
| MAIN SCAN | — | -6.78E-08 | 7.30643E-10 | 1.57725E-05 |
| SUB SCAN | — | 3.31E-05 | -3.55931E-07 | 0.000169964 |

FIG.12

ECCENTRICITY AND TILT DATA OF EACH LOCAL COORDINATE SYSTEM

<table>
<tr><th rowspan="3">SURFACE NO.</th><th colspan="6">ECCENTRICITY</th><th colspan="5">TILT ANGLE</th></tr>
<tr><th colspan="2">y DIRECTION</th><th colspan="4">z DIRECTION</th><th>ABOUT z AXIS</th><th colspan="4">ABOUT y AXIS</th></tr>
<tr><th>COMMON</th><th>COMMON</th><th>RAY1</th><th>RAY2</th><th>RAY3</th><th>RAY4</th><th>COMMON</th><th>RAY1</th><th>RAY2</th><th>RAY3</th><th>RAY4</th></tr>
<tr><td>1</td><td></td><td></td><td>5.3</td><td>0.5</td><td>-1.9</td><td>-5.3</td><td></td><td>-0.0216</td><td>0.0009</td><td>0.0042</td><td>0.0216</td></tr>
<tr><td>2</td><td></td><td></td><td></td><td></td><td></td><td></td><td></td><td></td><td></td><td></td><td></td></tr>
<tr><td>3</td><td></td><td></td><td></td><td></td><td></td><td></td><td></td><td></td><td></td><td></td><td></td></tr>
<tr><td>4</td><td></td><td></td><td></td><td></td><td></td><td></td><td></td><td></td><td></td><td></td><td></td></tr>
<tr><td>5</td><td></td><td></td><td></td><td></td><td></td><td></td><td></td><td></td><td></td><td></td><td></td></tr>
<tr><td>6</td><td></td><td></td><td></td><td></td><td></td><td></td><td></td><td></td><td></td><td></td><td></td></tr>
<tr><td>7</td><td></td><td></td><td></td><td></td><td></td><td></td><td></td><td></td><td></td><td></td><td></td></tr>
<tr><td>8</td><td></td><td></td><td></td><td></td><td></td><td></td><td></td><td></td><td></td><td></td><td></td></tr>
<tr><td>9</td><td></td><td></td><td></td><td></td><td></td><td></td><td>-1.0197</td><td></td><td></td><td></td><td></td></tr>
<tr><td>10</td><td>-1.4</td><td></td><td></td><td></td><td></td><td></td><td>1.0197</td><td></td><td></td><td></td><td></td></tr>
<tr><td colspan="12">PRE-DEFLECTION OPTICAL SYSTEM</td></tr>
<tr><td>11</td><td colspan="11">DEFLECTION SURFACE</td></tr>
<tr><td>12</td><td></td><td></td><td></td><td></td><td></td><td></td><td></td><td></td><td></td><td></td><td></td></tr>
<tr><td>13</td><td></td><td></td><td></td><td></td><td></td><td></td><td></td><td></td><td></td><td></td><td></td></tr>
<tr><td>14</td><td></td><td></td><td></td><td></td><td></td><td></td><td></td><td></td><td></td><td></td><td></td></tr>
<tr><td>15</td><td></td><td></td><td></td><td></td><td></td><td></td><td></td><td></td><td></td><td></td><td></td></tr>
<tr><td>16</td><td></td><td></td><td></td><td></td><td></td><td></td><td></td><td></td><td></td><td></td><td></td></tr>
<tr><td>17</td><td></td><td></td><td></td><td></td><td></td><td></td><td>-1.0197</td><td></td><td></td><td></td><td></td></tr>
<tr><td>18</td><td></td><td></td><td></td><td></td><td></td><td></td><td></td><td>0.2844</td><td>0.1809</td><td>-0.2332</td><td>-0.3133</td></tr>
<tr><td>19</td><td></td><td></td><td></td><td></td><td></td><td></td><td></td><td>-0.2844</td><td>-0.1809</td><td>0.2332</td><td>0.3133</td></tr>
<tr><td>20</td><td></td><td></td><td></td><td></td><td></td><td></td><td></td><td></td><td></td><td></td><td></td></tr>
<tr><td colspan="12">POST-DEFLECTION OPTICAL SYSTEM</td></tr>
</table>

FIG.13

COEFFICIENT TABLE 1  COEFFICIENT VALUE OF $a_{lm}$

| m\l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | 0.00775 | -2E-05 | -3E-06 | -3E-06 | 1.5E-09 | 4.89E-09 | 1.2E-11 | -7.9E-12 | -1E-14 | 3.33E-15 | 0 | 0 |
| 2 | 0.052039 | 8.5E-05 | -3E-06 | 1.4E-07 | -7E-10 | -3E-10 | -1.7E-11 | 4.9E-13 | -1.7E-13 | 8.8E-18 | 2.01E-16 | 0 | 0 |
| 4 | -0.00018 | -4E-07 | -2E-07 | -9E-09 | -2E-09 | 3.2E-11 | 8.48E-12 | -1E-14 | -9.9E-15 | -4.7E-17 | 4.24E-18 | 0 | 0 |
| 6 | 3.19E-06 | 8.4E-09 | -3E-09 | -8E-11 | 3.7E-11 | 1.4E-12 | -1.5E-13 | -5E-15 | 2.42E-16 | 4.72E-18 | -1.6E-19 | 0 | 0 |
| 8 | -1.3E-08 | -2E-10 | -1E-11 | 3.5E-12 | 1.5E-13 | -3E-14 | -3.1E-16 | 6.6E-17 | -8.3E-20 | -5.3E-20 | 4.87E-22 | 0 | 0 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |

COEFFICIENT TABLE 2  COEFFICIENT VALUE OF $a_{lm}$

| m\l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | 0.00516 | -2E-05 | -3E-06 | -3E-06 | 3.1E-10 | 2.45E-09 | 6.9E-12 | -3.1E-12 | -2.3E-15 | 1.37E-16 | 0 | 0 |
| 2 | 0.008539 | 6.3E-05 | -7E-07 | 1E-07 | -3E-09 | -2E-10 | 2.24E-11 | 2.8E-13 | -1.7E-13 | 7.23E-17 | 1.33E-16 | 0 | 0 |
| 4 | -0.00012 | 1.9E-07 | -1E-07 | -8E-09 | -1E-09 | 2.5E-11 | 3.16E-12 | -1E-14 | -1.8E-16 | -2.4E-17 | -1.5E-18 | 0 | 0 |
| 6 | 3.22E-07 | -1E-08 | -2E-09 | 9.6E-11 | 3.3E-11 | 2.1E-13 | -8.5E-14 | -2E-15 | 5.66E-17 | 1.65E-18 | -2.2E-21 | 0 | 0 |
| 8 | 6.95E-10 | 7.3E-11 | -1E-11 | 3.7E-13 | 5.5E-14 | -8E-15 | -2.4E-16 | 2.3E-17 | 5.32E-19 | -1.8E-20 | -3.5E-22 | 0 | 0 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |

COEFFICIENT TABLE 3  COEFFICIENT VALUE OF $a_{lm}$

| m\l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | -0.0041 | -3E-05 | 2.3E-07 | -1E-07 | 2.2E-11 | 1.31E-11 | 1.7E-15 | -8.1E-16 | 2.25E-19 | -5.2E-22 | -1E-23 | 3.3E-25 |
| 2 | 0.000659 | -5E-06 | 3.6E-07 | -3E-10 | 6.8E-11 | -1E-13 | -1E-14 | -1E-18 | -1.1E-18 | 1.38E-22 | 3.84E-23 | 1.41E-26 | 7.09E-28 |
| 4 | 1.84E-06 | -3E-09 | -5E-10 | -2E-12 | 6.9E-14 | -1E-16 | 2.05E-17 | -2E-20 | 5.5E-22 | 4.22E-24 | -3.1E-26 | -4.1E-28 | -2.2E-30 |
| 6 | 1.68E-08 | 1.8E-10 | -3E-12 | 2E-15 | -5E-16 | -2E-19 | 8.91E-20 | 1.4E-23 | 2.13E-23 | -1.3E-26 | 1.18E-27 | 1.74E-30 | -5E-32 |
| 8 | -1.4E-10 | -6E-15 | 2.8E-14 | -1E-16 | -4E-18 | 6.9E-22 | -1E-22 | 1.5E-24 | 9.03E-26 | -3.3E-29 | -3.9E-30 | 9.83E-34 | -1.4E-33 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |
| 22 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 |

COEFFICIENT TABLE 4  COEFFICIENT VALUE OF $a_{lm}$

| m\l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | -0.0059 | -0.0007 | 3.6E-07 | -1E-08 | 1E-11 | 2.62E-12 | 1.7E-15 | 3.22E-16 | 3.26E-19 | -6.5E-20 | -1.1E-23 | 1.6E-24 |
| 2 | -0.00416 | -5E-06 | 2.5E-07 | -2E-10 | 4.4E-11 | -1E-13 | -2.5E-15 | -8E-19 | -1.5E-18 | 1.25E-22 | 6.39E-24 | -1.2E-26 | 2.03E-27 |
| 4 | 2E-06 | -5E-09 | -1E-10 | -2E-12 | 5.2E-14 | 2E-16 | -5.6E-18 | -5E-20 | 2.47E-21 | -5.6E-26 | -3.4E-28 | 6.71E-29 | -2.6E-31 |
| 6 | -3.5E-08 | 2E-10 | -2E-12 | -4E-15 | 3.4E-16 | 2.6E-20 | 1.8E-20 | -2E-22 | 2.49E-23 | 1.87E-26 | 1.52E-27 | 2.07E-30 | -1.1E-31 |
| 8 | 1.74E-10 | -2E-13 | 3.7E-15 | -9E-17 | -7E-18 | 1.5E-21 | 4.66E-22 | 6.8E-25 | 3.35E-26 | 1.5E-28 | -4.4E-30 | -2.1E-32 | -1E-33 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |
| 22 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 |

FIG.14

COEFFICIENT TABLE 4  COEFFICIENT OF OPTICAL PATH DIFFERENCE FUNCTION $c_{lm}$

| m \ l | 0 | 1 | 2 | 3 | 4 |
|---|---|---|---|---|---|
| 0 | 0 | 0 | 3.39E-08 | 0 | -1.6E-11 |
| 2 | -1.7E-05 | 0 | 1.68E-09 | 0 | -3.1E-13 |
| 4 | 1.59E-07 | 0 | 1.22E-11 | 0 | 9.72E-15 |
| 6 | 1.35E-10 | 0 | -6.8E-13 | 0 | 3.48E-18 |

FIG.16

QUANTITY OF CHANGE FOR TEMPERATURE RISE OF 15 DEGREES

| | BEAM POSITION IN SUB SCANNING DIRECTION | DEFOCUSING IN MAIN SCANNING DIRECTION | DEFOCUSING IN SUB SCANNING DIRECTION | BEAM POSITION IN SUB SCANNING DIRECTION (LBO) | $\alpha_H \times LBO \times t$ | QUANTITY OF CHANGE IN RAY4 REFERENCE BEAM SPACING |
|---|---|---|---|---|---|---|
| ray1 | 0.013 | 0.0 | 1.3 | 10.8 | 0.003 | 0.025 |
| ray2 | -0.001 | 0.0 | 1.6 | 2.1 | 0.001 | 0.011 |
| ray3 | -0.002 | 0.0 | 1.5 | -5.0 | -0.002 | 0.010 |
| ray4 | -0.013 | 0.0 | 1.3 | -10.9 | -0.003 | 0.000 |

QUANTITY OF RAY1 SHIFT IN SUB SCANNING DIRECTION − QUANTITY OF RAY4 SHIFT IN SUB SCANNING DIRECTION:   0.025

FIG.17

DIAMETER OF INSCRIBED CIRCLE OF POLYGON MIRROR  40.0

POSITION OF ROTATION CENTER OF POLYGON MIRROR  X 17.2  Y 10.1
(POSITION AS VIEWED FROM LOCAL COORDINATE SYSTEM OF POLYGON REFLECTION SURFACE)

|  | RAY1 | RAY2 | RAY3 | RAY4 |
|---|---|---|---|---|
| IMAGE FORMING POSITION OF FINITE LENS | 3462.1 | 2710.7 | 2843.8 | 3499.0 |

| | SURFACE NO. | CURVATURE | | | TH | | | | REFRACTIVE INDEX N | NOTES |
|---|---|---|---|---|---|---|---|---|---|---|
| | | MAIN SCAN cuy | SUB SCAN cuz | COMMON | RAY1 | RAY2 | RAY3 | RAY4 | | |
| PRE-DEFLECTION OPTICAL SYSTEM | 1 | | | | 33.3 | 33.3 | 33.3 | 33.3 | | |
| | 2 | 0 | 0.0183 | 5.0 | | | | | 1.511 | |
| | 3 | | | | −0.7 | −1.0 | −0.8 | −0.7 | | |
| | 4 | | | 67.9 | | | | | | |
| | 5 | | | 10.0 | | | | | 1.511 | |
| | 6 | | | 14.3 | | | | | | |
| | 7 | | | 2.0 | | | | | 1.511 | |
| | 8 | | | 11.1 | | | | | | |
| POST-DEFLECTION OPTICAL SYSTEM | 9 | | | −6.8 | | | | | | DEFLECTION SURFACE |
| | 10 | | | −2.0 | | | | | | |
| | 11 | | | −25.3 | | | | | | |
| | 12 | 0.01683 | −0.0732 | −5.6 | | | | | −1.503 | PLASTIC LENS. CURVED SURFACE POLYNOMIAL COEFFICIENT : TABLE 1 |
| | 13 | 0.02132 | 0.05538 | −129.7 | | | | | | PLASTIC LENS. CURVED SURFACE POLYNOMIAL COEFFICIENT : TABLE 2 |
| | 14 | 0.00097 | −0.0139 | −5.9 | | | | | −1.503 | PLASTIC LENS. CURVED SURFACE POLYNOMIAL COEFFICIENT : TABLE 3 |
| | 15 | 0.00242 | 0.0089 | −131.5 | | | | | | PLASTIC LENS. CURVED SURFACE POLYNOMIAL COEFFICIENT : TABLE 4 |
| | 16 | | | −2.0 | | | | | −1.511 | |
| | 17 | | | | −0.4 | 0.0 | −0.1 | −0.4 | | |
| | 18 | | | −83.0 | | | | | | |

GLASS (BK7) : 1.511
PLASTIC LENS : 1.503

REFRACTIVE INDEX AFTER REFLECTION, DISTANCE BETWEEN SURFACES AND SHAPE DATA HAVE NEGATIVE SIGN (−) ADDED THERETO
LENS SURFACE SHAPE WITH CURVED SURFACE POLYNOMIAL COEFFICIENT DATA IS EXPRESSED BY THE FOLLOWING EQUATION
$x = (cuy*y^2 + cuz*z^2)/(1 + \sqrt{1 - ay*cuy^2*y^2 - az*cuz^2*z^2}) + \sum a_{lm}*y^l*z^m$ IN THIS EXAMPLE, $ay=1, az=1$
y DIRECTION: MAIN SCANNING DIRECTION, z DIRECTION: SUB SCANNING DIRECTION, x DIRECTION: DIRECTION OF OPTICAL AXIS (+ SIDE IN EACH LOCAL COORDINATE SYSTEM
OF PRE-DEFLECTION OPTICAL SYSTEM AND − SIDE IN EACH LOCAL COORDINATE SYSTEM OF POST-DEFLECTION OPTICAL SYSTEM

FIG.18

PARAXIAL POWER OF fθ2 PLASTIC LENS

| | CURVATURE OF PARAXIAL PART | | EACH SURFACE POWER | | EQUIVALENT SPACING | POWER OF PARAXIAL PART AS LENS | φ/ν |
|---|---|---|---|---|---|---|---|
| | INCIDENT SURFACE | EXIT SURFACE | INCIDENT SURFACE | EXIT SURFACE | | | |
| MAIN SCAN | -1.675E-02 | -2.115E-02 | -8.44E-03 | 1.06E-02 | 3.7247 | 0.002548381 | 1.53184E-05 |
| SUB SCAN | -4.059E-02 | -7.905E-02 | -2.04E-02 | 3.98E-02 | 3.7247 | 0.022389421 | 0.000134583 |

PARAXIAL POWER OF fθ2 PLASTIC LENS

| | CURVATURE OF PARAXIAL PART | | EACH SURFACE POWER | | EQUIVALENT SPACING | POWER OF PARAXIAL PART AS LENS | φ/ν |
|---|---|---|---|---|---|---|---|
| | INCIDENT SURFACE | EXIT SURFACE | INCIDENT SURFACE | EXIT SURFACE | | | |
| MAIN SCAN | -8.967E-04 | -9.707E-04 | -4.51E-04 | 4.89E-04 | 3.92424 | 3.809995E-05 | 2.29017E-07 |
| SUB SCAN | 1.229E-02 | 7.159E-05 | 6.19E-03 | -3.60E-05 | 3.92424 | 0.006153915 | 3.69914E-05 |

| | DIFFRACTION SURFACE POWER | | φ/ν | Σφ/ν |
|---|---|---|---|---|
| | INCIDENT SURFACE | EXIT SURFACE | | |
| MAIN SCAN | — | -3.01E-07 | 3.23616E-09 | 1.55506E-05 |
| SUB SCAN | — | -9.39E-05 | 1.01138E-06 | 0.000172586 |

FIG.19

ECCENTRICITY AND TILT DATA OF EACH LOCAL COORDINATE SYSTEM

| SURFACE NO. | ECCENTRICITY | | | | | | TILT ANGLE | | | | |
|---|---|---|---|---|---|---|---|---|---|---|---|
| | y DIRECTION | z DIRECTION | | | | | ABOUT z AXIS | ABOUT y AXIS | | | |
| | COMMON | COMMON | RAY1 | RAY2 | RAY3 | RAY4 | COMMON | RAY1 | RAY2 | RAY3 | RAY4 |
| 1 | | | 5.3 | 0.5 | −1.9 | −5.3 | | −0.0216 | 0.0009 | 0.0042 | 0.0216 |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |
| 9 | | | | | | | −1.0197 | | | | |
| 10 | −1.4 | | | | | | 1.0197 | | | | |
| 11 | DEFLECTION SURFACE | | | | | | −1.0197 | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |
| 17 | | | | | | | | | | | |
| 18 | | | | | | | | 0.3890 | 0.1821 | 0.3288 | 0.4112 |
| 19 | | | | | | | | −0.3890 | −0.1821 | −0.3288 | −0.4112 |
| 20 | | | | | | | | | | | 0.4112 |

PRE-DEFLECTION OPTICAL SYSTEM: rows 1–10
POST-DEFLECTION OPTICAL SYSTEM: rows 11–20

FIG.20

COEFFICIENT TABLE 1  COEFFICIENT VALUE OF $a_{lm}$

| m \ l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | 0.00896 | -4E-05 | -3E-06 | -3E-06 | 1.7E-09 | 4.9E-09 | 1.2E-11 | -8E-12 | -1E-14 | 3.3E-15 | 0 | 0 |
| 2 | 0.05711 | 8.6E-05 | -2E-06 | 1.3E-07 | 4E-10 | -3E-10 | -2E-11 | 5.4E-13 | -2E-13 | 1.5E-16 | 2.2E-16 | 0 | 0 |
| 4 | 8.9E-06 | -3E-07 | -2E-07 | -9E-09 | -2E-09 | 3.3E-11 | 8.3E-12 | -1E-14 | -1E-14 | -6E-17 | 3.3E-18 | 0 | 0 |
| 6 | -2E-07 | 1.4E-08 | -2E-09 | -1E-10 | 3.6E-11 | 1.4E-12 | -1E-13 | -5E-15 | 2.4E-16 | 4.9E-18 | -1E-19 | 0 | 0 |
| 8 | 4.2E-09 | -2E-10 | -2E-11 | 3.5E-12 | 1.6E-13 | -3E-14 | -3E-16 | 6.6E-17 | -1E-19 | -5E-20 | 3.7E-22 | 0 | 0 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |

COEFFICIENT TABLE 2  COEFFICIENT VALUE OF $a_{lm}$

| m \ l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | 0.00596 | -8E-05 | -3E-06 | -3E-06 | 2.5E-10 | 2.5E-09 | 7E-12 | -3E-12 | -2E-15 | 1.7E-16 | 0 | 0 |
| 2 | 0.01185 | 6.1E-05 | -2E-07 | 1E-07 | -3E-09 | -2E-10 | 2.2E-11 | 3.5E-13 | -2E-13 | 9.1E-17 | 1.4E-16 | 0 | 0 |
| 4 | -2E-05 | 2.4E-07 | -7E-08 | -7E-09 | -1E-09 | 2.3E-11 | 3.1E-12 | -1E-14 | -4E-16 | -2E-17 | -2E-18 | 0 | 0 |
| 6 | -6E-07 | -8E-09 | -1E-09 | 7.8E-11 | 3.3E-11 | 2.5E-13 | -9E-14 | -2E-15 | 5E-17 | 1.5E-18 | 1.6E-20 | 0 | 0 |
| 8 | 3.9E-09 | 3.5E-11 | -2E-11 | 6.9E-13 | 3.8E-14 | -8E-15 | -2E-16 | 2.2E-18 | 5.5E-19 | -2E-20 | -5E-22 | 0 | 0 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |

COEFFICIENT TABLE 3  COEFFICIENT VALUE OF $a_{lm}$

| m \ l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | -0.0033 | -4E-05 | 2.5E-07 | -1E-07 | 1.8E-11 | 1.3E-11 | 1.1E-15 | -8E-16 | 2E-19 | -7E-22 | -2E-23 | 3.2E-25 |
| 2 | 0.00081 | -5E-06 | 3.5E-07 | -3E-10 | 6.8E-11 | -1E-13 | -1E-14 | -2E-18 | -1E-18 | 6.1E-23 | 3.8E-23 | -5E-27 | 5.5E-28 |
| 4 | 1.8E-06 | -4E-09 | -5E-10 | -2E-12 | 7.1E-14 | -1E-16 | 2E-17 | -2E-20 | 5.4E-22 | 4.2E-24 | -1E-26 | 1.2E-27 | 1.9E-30 | -4E-32 |
| 6 | -2E-09 | 1.8E-10 | -3E-12 | 1.3E-15 | -5E-16 | -2E-19 | 9.1E-20 | 7E-23 | 2.2E-23 | -1E-26 | 1.2E-27 | 1.9E-30 | -4E-32 |
| 8 | -2E-11 | 7E-15 | 2.9E-14 | -1E-16 | -5E-18 | 1E-21 | -1E-22 | 1.6E-24 | 9.1E-26 | -8E-30 | -3E-30 | -5E-33 | -1E-33 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |
| 22 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 |

COEFFICIENT TABLE 4  COEFFICIENT VALUE OF $a_{lm}$

| m \ l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | -0.0054 | -0.0007 | 3.8E-07 | -1E-08 | 1.1E-11 | 2.6E-12 | 1E-15 | 3.2E-16 | 2.8E-19 | -7E-20 | -2E-23 | 1.6E-24 |
| 2 | -0.0045 | -5E-06 | 2.7E-07 | -2E-10 | 4.4E-11 | -1E-13 | -3E-15 | -2E-18 | -1E-18 | -6E-24 | 5.7E-24 | -1E-26 | 1.9E-27 |
| 4 | 1.7E-06 | -5E-09 | -1E-10 | -2E-12 | 5E-14 | 2.1E-16 | -5E-18 | -5E-20 | 2.5E-21 | -2E-25 | 7E-27 | 1.2E-28 | -5E-31 |
| 6 | -1E-08 | 2E-10 | -2E-12 | -5E-15 | 3.2E-16 | 1.3E-20 | 1.7E-20 | -2E-22 | 2.5E-23 | 1.5E-26 | 1.5E-27 | 1.3E-30 | -1E-31 |
| 8 | 6.4E-11 | -2E-13 | 2.5E-15 | -9E-17 | -6E-18 | 1.2E-21 | 5.1E-22 | 7.9E-25 | 3.6E-26 | 1.9E-28 | -4E-30 | -2E-32 | -1E-33 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |
| 22 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 |

FIG.21

COEFFICIENT TABLE 4  COEFFICIENT OF OPTICAL PATH DIFFERENCE FUNCTION $c_{lm}$

| m \ l | 0 | 1 | 2 | 3 | 4 |
|---|---|---|---|---|---|
| 0 | 0 | 0 | 1.5E-07 | 0 | -4.7E-11 |
| 2 | 4.7E-05 | 0 | 6.54E-09 | 0 | 1.28E-13 |
| 4 | -1.1E-06 | 0 | 6.53E-14 | 0 | 1.06E-14 |
| 6 | 6.52E-09 | 0 | -8.2E-13 | 0 | -7.5E-18 |

FIG.23

QUANTITY OF CHANGE FOR TEMPERATURE RISE OF 15 DEGREES

| | BEAM POSITION IN SUB SCANNING DIRECTION | DEFOCUSING IN MAIN SCANNING DIRECTION | DEFOCUSING IN SUB SCANNING DIRECTION | BEAM POSITION IN SUB SCANNING DIRECTION (LBO) | $\alpha_H \times LBO \times t$ | QUANTITY OF CHANGE IN RAY4 REFERENCE BEAM SPACING |
|---|---|---|---|---|---|---|
| ray1 | 0.006 | 0.0 | 1.7 | 11.7 | 0.004 | 0.011 |
| ray2 | -0.004 | 0.0 | 1.8 | 2.3 | 0.001 | 0.002 |
| ray3 | 0.004 | 0.0 | 1.8 | -5.6 | -0.002 | 0.009 |
| ray4 | -0.006 | 0.0 | 1.7 | -11.9 | -0.004 | 0.000 |

QUANTITY OF RAY1 SHIFT IN SUB SCANNING DIRECTION – QUANTITY OF RAY4 SHIFT IN SUB SCANNING DIRECTION: 0.011

FIG.24

DIAMETER OF INSCRIBED CIRCLE OF POLYGON MIRROR    40.0

POSITION OF ROTATION CENTER OF POLYGON MIRROR    X 17.2    Y 10.1
(POSITION AS VIEWED FROM LOCAL COORDINATE SYSTEM OF POLYGON REFLECTION SURFACE)

| | | RAY1 | RAY2 | RAY3 | RAY4 |
|---|---|---|---|---|---|
| IMAGE FORMING POSITION OF FINITE LENS | | 665.7 | 661.1 | 658.8 | 667.7 |

| | SURFACE NO. | CURVATURE | | TH | | | | REFRACTIVE INDEX N | NOTES |
|---|---|---|---|---|---|---|---|---|---|
| | | MAIN SCAN cuy | SUB SCAN cuz | COMMON | RAY1 | RAY2 | RAY3 | RAY4 | | |
| PRE-DEFLECTION OPTICAL SYSTEM | 1 | | | | 33.3 | 33.3 | 33.3 | 33.3 | | |
| | 2 | 0 | 0.0183 | 5.0 | | | | | 1.511 | |
| | 3 | | | 67.9 | -22.5 | -20.3 | -20.7 | -22.1 | | |
| | 4 | | | 10.0 | | | | | | |
| | 5 | | | 0.5 | | | | | 1.511 | |
| | 6 | 0.00067 | 0.00672 | 3.0 | | | | | | PLASTIC LENS.CURVED SURFACE POLYNOMIAL COEFFICIENT : TABLE 1 |
| | 7 | 0.00341 | 0.0309 | 38.7 | | | | | 1.511 | PLASTIC LENS.CURVED SURFACE POLYNOMIAL COEFFICIENT : TABLE 2 |
| | 8 | | | 2.0 | | | | | | |
| | 9 | | | 11.1 | | | | | | |
| POST-DEFLECTION OPTICAL SYSTEM | 10 | | | -6.8 | | | | | | DEFLECTION SURFACE |
| | 11 | | | -2.0 | | | | | -1.511 | |
| | 12 | 0.01917 | -0.0698 | -25.3 | | | | | | |
| | 13 | 0.02308 | 0.0113 | -5.6 | | | | | -1.503 | PLASTIC LENS.CURVED SURFACE POLYNOMIAL COEFFICIENT : TABLE 3 |
| | 14 | 0.00098 | -0.0128 | -129.7 | | | | | -1.503 | PLASTIC LENS.CURVED SURFACE POLYNOMIAL COEFFICIENT : TABLE 4 |
| | 15 | 0.00246 | 0.01158 | -5.9 | | | | | | PLASTIC LENS.CURVED SURFACE POLYNOMIAL COEFFICIENT : TABLE 5 |
| | 16 | | | -131.5 | | | | | -1.511 | PLASTIC LENS.CURVED SURFACE POLYNOMIAL COEFFICIENT : TABLE 6 |
| | 17 | | | -2.0 | 0.0 | 0.0 | 0.1 | 0.0 | | |
| | 18 | | | -83.0 | 0.0 | 0.0 | 0.0 | 0.0 | | |

GLASS (BK7) : 1.511
PLASTIC LENS : 1.503

REFRACTIVE INDEX AFTER REFLECTION, DISTANCE BETWEEN SURFACES AND SHAPE DATA HAVE NEGATIVE SIGN (-) ADDED THERETO
LENS SURFACE SHAPE WITH CURVED SURFACE POLYNOMIAL COEFFICIENT DATA IS EXPRESSED BY THE FOLLOWING EQUATION
$x = (cuy*y^2 + cuz*z^2)/(1 + Sqrt(1 - ay*cuy^2*y^2 - az*cuz^2*z^2)) + \Sigma a_{lm}*y^l*z^m$ IN THIS EXAMPLE, $ay=1, az=1$
y DIRECTION: MAIN SCANNING DIRECTION, z DIRECTION: SUB SCANNING DIRECTION, x DIRECTION: DIRECTION OF OPTICAL AXIS (+ SIDE IN EACH LOCAL COORDINATE SYSTEM OF PRE-DEFLECTION OPTICAL SYSTEM AND - SIDE IN EACH LOCAL COORDINATE SYSTEM OF POST-DEFLECTION OPTICAL SYSTEM

FIG.25

PARAXIAL POWER OF PRE-DEFLECTION PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | 6.134E-05 | 3.922E-03 | 3.09E-05 | -1.97E-03 | 1.99538 | -0.001943521 | -1.16826E-05 |
| SUB SCAN | 4.319E-03 | 3.123E-02 | 2.17E-03 | -1.57E-02 | 1.99538 | -0.013482742 | -8.10452E-05 |

PARAXIAL POWER OF fθ1 PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | -2.019E-02 | -2.553E-02 | -1.02E-02 | 1.29E-02 | 3.7247 | 0.003175624 | 1.90888E-05 |
| SUB SCAN | 3.781E-02 | -6.413E-02 | 1.90E-02 | 3.23E-03 | 3.7247 | 0.022033625 | 0.000132445 |

PARAXIAL POWER OF fθ2 PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | -1.051E-03 | -8.439E-04 | -5.29E-04 | 4.25E-04 | 3.92424 | -0.000103609 | -6.22798E-07 |
| SUB SCAN | 9.711E-03 | -7.526E-03 | 4.89E-03 | 3.79E-03 | 3.92424 | 0.008605596 | 5.17285E-05 |

| | DIFFRACTION SURFACE POWER | | $\phi/\nu$ | $\Sigma\phi/\nu$ |
|---|---|---|---|---|
| | INCIDENT SURFACE | EXIT SURFACE | | |
| MAIN SCAN | — | -8.07E-08 | 8.68654E-10 | 1.84668E-05 |
| SUB SCAN | — | -4.17E-05 | 4.48934E-07 | 0.000184622 |

FIG.26

ECCENTRICITY AND TILT DATA OF EACH LOCAL COORDINATE SYSTEM

| SURFACE NO. | ECCENTRICITY | | | | | | TILT ANGLE | | | | |
|---|---|---|---|---|---|---|---|---|---|---|---|
| | y DIRECTION | z DIRECTION | | | | | ABOUT z AXIS | ABOUT y AXIS | | | |
| | COMMON | COMMON | RAY1 | RAY2 | RAY3 | RAY4 | COMMON | RAY1 | RAY2 | RAY3 | RAY4 |
| 1 | | | 9.8 | 1.1 | -3.3 | -9.8 | | -0.0744 | -0.0076 | 0.0226 | 0.0744 |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |
| 9 | | | | | | | -1.0197 | | | | |
| 10 | -1.4 | | | | | | 1.0197 | | | | |
| DEFLECTION SURFACE | | | | | | | | | | | |
| 11 | | | | | | | -1.0197 | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |
| 17 | | | | | | | | | | | |
| 18 | | | | | | | | -0.4222 | -0.0444 | 0.1509 | 0.4206 |
| 19 | | | | | | | | 0.4222 | 0.0444 | -0.1509 | -0.4206 |
| 20 | | | | | | | | | | | |

PRE-DEFLECTION OPTICAL SYSTEM: surfaces 1–10
POST-DEFLECTION OPTICAL SYSTEM: surfaces 11–20

FIG.27

COEFFICIENT TABLE 1 COEFFICIENT VALUE OF $a_{lm}$

| l \ m | 0 | 1 | 2 | 3 | 4 | 5 | 6 |
|---|---|---|---|---|---|---|---|
| 0 | 0 | 0 | -0.0003 | 0 | 3.14E-07 | 0 | 7.79E-09 |
| 2 | -0.0012 | 0 | -1.7E-07 | 0 | -6E-08 | 0 | 2.56E-12 |
| 4 | 3.66E-05 | 0 | 9.97E-08 | 0 | -4E-09 | 0 | 2.58E-13 |
| 6 | 2.26E-08 | 0 | -4.2E-09 | 0 | 3.7E-11 | 0 | 3.37E-14 |

COEFFICIENT TABLE 2 COEFFICIENT VALUE OF $a_{lm}$

| l \ m | 0 | 1 | 2 | 3 | 4 | 5 | 6 |
|---|---|---|---|---|---|---|---|
| 0 | 0 | 0 | 0.000255 | 0 | -7.2E-07 | 0 | 7.78E-09 |
| 2 | 0.000167 | 0 | 8.35E-06 | 0 | 2.23E-07 | 0 | -4E-09 |
| 4 | 2.72E-06 | 0 | -4.7E-08 | 0 | -1.3E-08 | 0 | 1.6E-10 |
| 6 | -9.9E-08 | 0 | 1.37E-09 | 0 | 1.15E-10 | 0 | -1.3E-12 |

COEFFICIENT TABLE 3 COEFFICIENT VALUE OF $a_{lm}$

| l \ m | 0 | 1 | 2 | 3 | 4 | 5 | 6 | 7 | 8 | 9 | 10 |
|---|---|---|---|---|---|---|---|---|---|---|---|
| 0 | 0 | 0.000945 | 0.000512 | -5E-06 | -2.8E-06 | 1.3E-10 | 5.8E-09 | 7.6E-12 | -7.8E-12 | -1E-14 | 2.86E-15 |
| 2 | 0.015998 | 8.55E-05 | -1.4E-05 | 1.74E-07 | -1.3E-08 | -2.3E-10 | 5.53E-12 | 3.23E-13 | -6.5E-14 | -2.3E-16 | 8.74E-17 |
| 4 | 0.000247 | -1.3E-07 | -3.7E-07 | -6.1E-09 | -1.7E-09 | 2.52E-11 | 9.2E-12 | -1.3E-14 | -1.5E-15 | -5E-17 | -1E-17 |
| 6 | -5.9E-06 | -2.9E-09 | 2.34E-08 | 3.55E-10 | -5.1E-11 | -1.1E-12 | -3.1E-13 | -4.3E-15 | 9.07E-16 | 9.46E-18 | -4.4E-19 |
| 8 | 3.71E-08 | 4.67E-10 | -7.8E-10 | -4.5E-12 | 3.79E-12 | -1.2E-14 | -4.6E-15 | 1.45E-16 | -3.2E-18 | -2E-19 | 6.55E-21 |

COEFFICIENT TABLE 4 COEFFICIENT VALUE OF $a_{lm}$

| l \ m | 0 | 1 | 2 | 3 | 4 | 5 | 6 | 7 | 8 | 9 | 10 |
|---|---|---|---|---|---|---|---|---|---|---|---|
| 0 | 0 | 0.001227 | -4.6E-06 | -4.6E-06 | -2.2E-06 | -2.2E-09 | 3.02E-09 | 5.38E-12 | -2.4E-12 | -4.5E-15 | -4.8E-16 |
| 2 | -0.00244 | 8.87E-05 | -5.4E-06 | 1.25E-07 | -9.6E-09 | -5.4E-11 | 1.61E-11 | 4.32E-14 | -8.3E-14 | 8.43E-17 | 6.09E-17 |
| 4 | 0.000273 | -3.8E-07 | 9.25E-08 | -5.1E-09 | -1.8E-09 | 2.67E-11 | 4.01E-12 | -3.6E-14 | 1.15E-14 | -2.6E-17 | -1.4E-17 |
| 6 | -5.7E-06 | 8E-09 | 3E-08 | 2.4E-10 | 3.74E-11 | -1.2E-12 | -3.9E-13 | -4E-16 | 1.86E-16 | 3.45E-18 | 1.45E-19 |
| 8 | 5.24E-08 | -2.6E-10 | -5.6E-10 | 3.06E-12 | 2.05E-12 | -2.5E-14 | -2.3E-15 | 9.25E-17 | 9.32E-19 | -9.8E-20 | 1.49E-22 |

COEFFICIENT TABLE 5 COEFFICIENT VALUE OF $a_{lm}$

| l \ m | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | -0.00538 | 3.56E-05 | 4.46E-07 | -1E-07 | 3.35E-11 | 1.35E-11 | 2.62E-15 | -8.2E-16 | 1.7E-19 | -2.6E-21 | -4.1E-24 | 4.3E-25 |
| 2 | -0.00154 | -4.9E-06 | 3.94E-07 | -3.4E-10 | 6.63E-11 | -1.3E-13 | -1.1E-14 | -1.5E-18 | -1.1E-18 | 5.92E-23 | 3.16E-23 | 1.35E-26 | 5.91E-28 |
| 4 | 6.27E-06 | -3.8E-09 | -4.4E-10 | -2E-12 | 3.16E-14 | -6.5E-17 | 1.66E-17 | -9.6E-21 | 3.77E-22 | 6.72E-24 | -5.5E-26 | -2.9E-28 | -6.5E-30 |
| 6 | 1.23E-08 | 1.98E-10 | -2.5E-12 | 1.27E-15 | -5.1E-16 | -8.7E-20 | 9.14E-20 | 2.07E-23 | 2.25E-23 | -5.6E-27 | 1.13E-27 | 5.88E-30 | -1E-31 |
| 8 | 7.57E-11 | -1.5E-13 | -4.8E-15 | -1.8E-16 | -6.5E-18 | -2.8E-21 | -2.3E-22 | 1.78E-24 | 7.73E-26 | 9.08E-29 | -2.2E-30 | -3.8E-33 | -5.7E-34 |

COEFFICIENT TABLE 6 COEFFICIENT VALUE OF $a_{lm}$

| l \ m | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | -0.00753 | -0.00081 | 6E-07 | -6.2E-09 | 2.38E-11 | 2.25E-12 | 1.48E-15 | 3.2E-16 | 3.94E-19 | -6.4E-20 | -7.5E-24 | 1.53E-24 |
| 2 | -0.00203 | -4.9E-06 | 2.18E-07 | -2.3E-10 | 4.36E-11 | -1.2E-13 | -2.5E-15 | -1.9E-18 | -1.5E-18 | 1.69E-22 | -1.9E-24 | -2.2E-26 | 6.94E-28 |
| 4 | 2.18E-06 | -4.4E-09 | -2.7E-10 | -2.3E-12 | 7.86E-14 | 2.05E-16 | -4.6E-18 | 2.22E-21 | -1.5E-20 | 1.63E-24 | -3.6E-26 | 4.11E-28 | -4.6E-30 |
| 6 | -3.6E-09 | 1.91E-10 | -3.6E-12 | -3.1E-15 | 1.81E-16 | 3.34E-19 | -8.2E-21 | -4.3E-20 | 2.11E-23 | 1.7E-26 | 1.36E-27 | 2.68E-30 | -8.1E-32 |
| 8 | 5.03E-11 | -1.9E-13 | 1.2E-15 | -8.1E-18 | -1.2E-16 | -4.9E-21 | 3.18E-22 | -3E-25 | 1.94E-26 | 2.39E-28 | -2.7E-30 | 2.21E-33 | -3.4E-34 |

FIG.28

COEFFICIENT TABLE 6  COEFFICIENT OF OPTICAL PATH DIFFERENCE FUNCTION $c_{lm}$

| m \ l | 0 | 1 | 2 | 3 | 4 |
|---|---|---|---|---|---|
| 0 | 0 | 0 | 4.03E-08 | 0 | 8.51E-12 |
| 2 | 2.08E-05 | 0 | -3.6E-09 | 0 | 1.84E-13 |
| 4 | 1.69E-07 | 0 | -1.5E-11 | 0 | 2.18E-15 |
| 6 | -1.8E-09 | 0 | -5.1E-14 | 0 | 1.4E-17 |

FIG.30

QUANTITY OF CHANGE FOR TEMPERATURE RISE OF 15 DEGREES

|  | BEAM POSITION IN SUB SCANNING DIRECTION | DEFOCUSING IN MAIN SCANNING DIRECTION | DEFOCUSING IN SUB SCANNING DIRECTION | BEAM POSITION IN SUB SCANNING DIRECTION (LBO) | $\alpha_H \times LBO \times t$ | QUANTITY OF CHANGE IN RAY4 REFERENCE BEAM SPACING |
|---|---|---|---|---|---|---|
| ray1 | -0.011 | -0.1 | 0.0 | 8.0 | 0.003 | -0.022 |
| ray2 | -0.002 | -0.2 | -0.8 | 1.5 | 0.000 | -0.013 |
| ray3 | 0.002 | -0.2 | -0.8 | -3.7 | -0.001 | -0.009 |
| ray4 | 0.011 | -0.1 | 0.0 | -8.2 | -0.003 | 0.000 |

QUANTITY OF RAY1 SHIFT IN SUB SCANNING DIRECTION - QUANTITY OF RAY4 SHIFT IN SUB SCANNING DIRECTION: -0.022

FIG.31

DIAMETER OF INSCRIBED CIRCLE OF POLYGON MIRROR     40.0

POSITION OF ROTATION CENTER OF POLYGON MIRROR          X          Y
(POSITION AS VIEWED FROM LOCAL COORDINATE SYSTEM OF POLYGON REFLECTION SURFACE)     17.2     10.1

|  | RAY1 | RAY2 | RAY3 | RAY4 |
|---|---|---|---|---|
| IMAGE FORMING POSITION OF FINITE LENS | 691.5 | 696.4 | 687.6 | 691.6 |

| SURFACE NO. | CURVATURE | | | TH | | | | REFRACTIVE INDEX N | NOTES |
|---|---|---|---|---|---|---|---|---|---|
| | MAIN SCAN cuy | SUB SCAN cuz | COMMON | RAY1 | RAY2 | RAY3 | RAY4 | | |
| PRE-DEFLECTION OPTICAL SYSTEM | | | | | | | | | |
| 1 | 0 | 0.0183 | 5.0 | 33.3 | 33.3 | 33.3 | 33.3 | 1.511 | |
| 2 | | | 67.9 | | | | | | |
| 3 | | | 10.0 | -16.1 | -12.6 | -13.9 | -16.0 | | |
| 4 | | | 0.5 | | | | | 1.511 | |
| 5 | -0.0013 | 0.00675 | 3.0 | | | | | | |
| 6 | 0.00225 | 0.03287 | 38.7 | | | | | | |
| 7 | | | 2.0 | | | | | 1.511 | |
| 8 | | | 11.1 | | | | | | |
| DEFLECTION SURFACE | | | | | | | | | |
| 9 | | | -6.8 | | | | | | |
| 10 | | | -2.0 | | | | | -1.511 | |
| 11 | | | -25.3 | | | | | | |
| POST-DEFLECTION OPTICAL SYSTEM | | | | | | | | | |
| 12 | 0.01917 | -0.0698 | -5.6 | | | | | -1.503 | PLASTIC LENS. CURVED SURFACE POLYNOMIAL COEFFICIENT : TABLE 3 |
| 13 | 0.02308 | 0.0113 | -129.7 | | | | | -1.503 | PLASTIC LENS. CURVED SURFACE POLYNOMIAL COEFFICIENT : TABLE 4 |
| 14 | 0.00098 | -0.0128 | -5.9 | | | | | -1.503 | PLASTIC LENS. CURVED SURFACE POLYNOMIAL COEFFICIENT : TABLE 5 |
| 15 | 0.00246 | 0.01158 | -131.5 | | | | | -1.503 | PLASTIC LENS. CURVED SURFACE POLYNOMIAL COEFFICIENT : TABLE 6 |
| 16 | | | -2.0 | | | | | -1.511 | |
| 17 | | | | -0.2 | 0.0 | 0.0 | -0.2 | | |
| 18 | | | -83.0 | | | | | | |

GLASS (BK7) : 1.511
PLASTIC LENS : 1.503

REFRACTIVE INDEX AFTER REFLECTION, DISTANCE BETWEEN SURFACES AND SHAPE DATA HAVE NEGATIVE SIGN (-) ADDED THERETO
LENS SURFACE SHAPE WITH CURVED SURFACE POLYNOMIAL COEFFICIENT DATA IS EXPRESSED BY THE FOLLOWING EQUATION
$x = (cuy*y^2 + cuz*z^2)/(1 + \text{Sqrt}(1 - ay*cuy^2*y^2 - az*cuz^2*z^2)) + \sum a_{lm}*y^l*z^m$ IN THIS EXAMPLE, $ay=1, az=1$
y DIRECTION: MAIN SCANNING DIRECTION, z DIRECTION: SUB SCANNING DIRECTION, x DIRECTION: DIRECTION OF OPTICAL AXIS (+ SIDE IN EACH LOCAL COORDINATE SYSTEM
OF PRE-DEFLECTION OPTICAL SYSTEM AND - SIDE IN EACH LOCAL COORDINATE SYSTEM OF POST-DEFLECTION OPTICAL SYSTEM

FIG.32

PARAXIAL POWER OF PRE-DEFLECTION PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | -4.426E-03 | -3.166E-04 | -2.23E-03 | 1.59E-04 | 1.99538 | -0.002068055 | -1.24311E-05 |
| SUB SCAN | 2.678E-03 | 3.904E-02 | 1.35E-03 | -1.97E-02 | 1.99538 | -0.018256851 | -0.000109742 |

PARAXIAL POWER OF fθ1 PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | -2.089E-02 | -2.666E-02 | -1.05E-02 | 1.34E-02 | 3.72470 | 0.003431451 | 2.06265E-05 |
| SUB SCAN | 4.215E-02 | 6.831E-03 | 2.12E-02 | -3.44E-03 | 3.72470 | 0.018055393 | 0.000108531 |

| DIFFRACTION SURFACE POWER | | $\phi/\nu$ |
|---|---|---|
| INCIDENT SURFACE | EXIT SURFACE | |
| MAIN SCAN | — | -5.91E-07 | 6.36676E-09 |
| SUB SCAN | — | -1.30E-04 | 1.40097E-06 |

PARAXIAL POWER OF fθ2 PLASTIC LENS

| | CURVATURE OF PARAXIAL PART | | EACH SURFACE POWER | | EQUIVALENT SPACING | POWER OF PARAXIAL PART AS LENS | $\phi/\nu$ |
|---|---|---|---|---|---|---|---|
| | INCIDENT SURFACE | EXIT SURFACE | INCIDENT SURFACE | EXIT SURFACE | | | |
| MAIN SCAN | 2.304E-04 | 7.081E-04 | 1.16E-04 | -3.57E-04 | 3.92424 | -0.000240362 | -1.44482E-06 |
| SUB SCAN | 7.842E-03 | -7.670E-03 | 3.95E-03 | 3.86E-03 | 3.92424 | 0.007750039 | 4.65857E-05 |

| $\Sigma \phi/\nu$ | |
|---|---|
| MAIN SCAN | 1.91881E-05 |
| SUB SCAN | 0.000156518 |

FIG.33

ECCENTRICITY AND TILT DATA OF EACH LOCAL COORDINATE SYSTEM

| SURFACE NO. | ECCENTRICITY | | | | | TILT ANGLE | | | | |
|---|---|---|---|---|---|---|---|---|---|---|
| | y DIRECTION | z DIRECTION | | | | ABOUT z AXIS | ABOUT y AXIS | | | |
| | COMMON | COMMON | RAY1 | RAY2 | RAY3 | RAY4 | COMMON | RAY1 | RAY2 | RAY3 | RAY4 |
| 1 | | | 12.5 | 2.0 | −5.5 | −12.5 | | −0.1051 | −0.0164 | 0.0457 | 0.1051 |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | −1.0197 | | | | |
| 9 | | | | | | | 1.0197 | | | | |
| 10 | −1.4 | | | | | | | | | | |
| 11 | | | | | | | −1.0197 | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |
| 17 | | | | | | | | | | | |
| 18 | | | | | | | | −0.4222 | −0.0444 | 0.1509 | 0.4206 |
| 19 | | | | | | | | 0.4222 | 0.0444 | −0.1509 | −0.4206 |
| 20 | | | | | | | | | | | |

PRE-DEFLECTION OPTICAL SYSTEM (surfaces 1–10)
DEFLECTION SURFACE (surface 11)
POST-DEFLECTION OPTICAL SYSTEM (surfaces 12–20)

COEFFICIENT TABLE 4  COEFFICIENT OF OPTICAL PATH DIFFERENCE FUNCTION $c_{lm}$

| l \ m | 0 | 1 | 2 | 3 | 4 |
|---|---|---|---|---|---|
| 0 | 0 | 0 | 2.96E-07 | 0 | 6.75E-10 |
| 2 | 6.5E-05 | 0 | -2.7E-07 | 0 | -5.2E-10 |
| 4 | -7.2E-05 | 0 | 8.76E-08 | 0 | 7.82E-11 |
| 6 | 8.41E-06 | 0 | 7.03E-09 | 0 | -3.5E-11 |

FIG.37

QUANTITY OF CHANGE FOR TEMPERATURE RISE OF 15 DEGREES

| | BEAM POSITION IN SUB SCANNING DIRECTION | DEFOCUSING IN MAIN SCANNING DIRECTION | DEFOCUSING IN SUB SCANNING DIRECTION | BEAM POSITION IN SUB SCANNING DIRECTION (LBO) | $\alpha_H \times LBO \times t$ | QUANTITY OF CHANGE IN RAY4 REFERENCE BEAM SPACING |
|---|---|---|---|---|---|---|
| ray1 | −0.014 | 0.0 | 0.2 | 8.0 | 0.003 | −0.028 |
| ray2 | −0.004 | −0.1 | −0.3 | 1.6 | 0.001 | −0.018 |
| ray3 | 0.005 | −0.1 | −0.1 | −3.8 | −0.001 | −0.009 |
| ray4 | 0.014 | 0.0 | 0.2 | −8.1 | −0.003 | 0.000 |

QUANTITY OF RAY1 SHIFT IN SUB SCANNING DIRECTION − QUANTITY OF RAY4 SHIFT IN SUB SCANNING DIRECTION: −0.028

FIG.38

DIAMETER OF INSCRIBED CIRCLE OF POLYGON MIRROR  40.0

POSITION OF ROTATION CENTER OF POLYGON MIRROR  Y 17.2  Z 10.1
(POSITION AS VIEWED FROM LOCAL COORDINATE SYSTEM OF POLYGON REFLECTION SURFACE)

IMAGE FORMING POSITION OF FINITE LENS

| | RAY1 | RAY2 | RAY3 | RAY4 |
|---|---|---|---|---|
| | 5518.7 | 4106.4 | 4336.0 | 5579.3 |

| | SURFACE NO. | CURVATURE | | | TH | | | | | REFRACTIVE INDEX N | NOTES |
|---|---|---|---|---|---|---|---|---|---|---|---|
| | | MAIN SCAN cuy | SUB SCAN cuz | COMMON | RAY1 | RAY2 | RAY3 | RAY4 | | | |
| PRE-DEFLECTION OPTICAL SYSTEM | 1 | | | 5.0 | 33.3 | 33.3 | 33.3 | 33.3 | | | |
| | 2 | 0.0183 | 0 | | −0.2 | −3.1 | −2.6 | −0.1 | | 1.514 | |
| | 3 | | | 67.9 | | | | | | | |
| | 4 | | | 10.0 | | | | | | 1.514 | |
| | 5 | | | 14.3 | | | | | | | |
| | 6 | | | 2.0 | | | | | | 1.514 | |
| | 7 | | | 11.1 | | | | | | | |
| | 8 | | | | | | | | | DEFLECTION SURFACE | |
| POST-DEFLECTION OPTICAL SYSTEM | 9 | | | 0.0 | | | | | | | |
| | 10 | | | 0.0 | | | | | | | |
| | 11 | | | 0.0 | | | | | | 0.000 | |
| | 12 | 3.7E−08 | 0 | 0.0 | | | | | | 0.000 | PLASTIC LENS.CURVED SURFACE POLYNOMIAL COEFFICIENT : TABLE 3 |
| | 13 | 5.2E−08 | 0 | −73.2 | | | | | | | PLASTIC LENS.CURVED SURFACE POLYNOMIAL COEFFICIENT : TABLE 4 |
| | 14 | 6.8E−11 | 0 | 0.0 | | | | | | 0.000 | PLASTIC LENS.CURVED SURFACE POLYNOMIAL COEFFICIENT : TABLE 5 |
| | 15 | 5.6E−11 | 0 | 0.0 | 0.0 | 0.0 | 0.0 | 0.0 | | 0.000 | PLASTIC LENS.CURVED SURFACE POLYNOMIAL COEFFICIENT : TABLE 6 |
| | 16 | | | 0.0 | | | | | | | |
| | 17 | | | | | | | | | | |
| | 18 | | | −83.0 | | | | | | | |

GLASS (BK7) : 1.514
PLASTIC LENS : 1.507

REFRACTIVE INDEX AFTER REFLECTION, DISTANCE BETWEEN SURFACES AND SHAPE DATA HAVE NEGATIVE SIGN (−) ADDED THERETO
LENS SURFACE SHAPE WITH CURVED SURFACE POLYNOMIAL COEFFICIENT DATA IS EXPRESSED BY THE FOLLOWING EQUATION
$x = (cuy*y^2 + cuz*z^2)/(1 + Sqrt(1 - ay*cuy^2*y^2 - az*cuz^2*z^2)) + \Sigma\, a_{lm}*y^l*z^m$ IN THIS EXAMPLE, $ay = 1, az = 1$
y DIRECTION: MAIN SCANNING DIRECTION, z DIRECTION: SUB SCANNING DIRECTION, x DIRECTION: DIRECTION OF OPTICAL AXIS (+ SIDE IN EACH LOCAL COORDINATE SYSTEM
OF PRE-DEFLECTION OPTICAL SYSTEM AND − SIDE IN EACH LOCAL COORDINATE SYSTEM OF POST-DEFLECTION OPTICAL SYSTEM

FIG.39

PARAXIAL POWER OF PRE-DEFLECTION PLASTIC LENS

| | CURVATURE OF PARAXIAL PART | | EACH SURFACE POWER | | EQUIVALENT SPACING | POWER OF PARAXIAL PART AS LENS |
|---|---|---|---|---|---|---|
| | INCIDENT SURFACE | EXIT SURFACE | INCIDENT SURFACE | EXIT SURFACE | | |
| MAIN SCAN | 0.000E+00 | 0.000E+00 | 0.00E+00 | 0.00E+00 | 0 | 0 |
| SUB SCAN | 0.000E+00 | 0.000E+00 | 0.00E+00 | 0.00E+00 | 0 | 0 |

FIG.40

ECCENTRICITY AND TILT DATA OF EACH LOCAL COORDINATE SYSTEM

| SURFACE NO. | ECCENTRICITY | | | | | | TILT ANGLE | | | | |
|---|---|---|---|---|---|---|---|---|---|---|---|
| | y DIRECTION | z DIRECTION | | | | | ABOUT z AXIS | ABOUT y AXIS | | | |
| | COMMON | COMMON | RAY1 | RAY2 | RAY3 | RAY4 | COMMON | RAY1 | RAY2 | RAY3 | RAY4 |
| PRE-DEFLECTION OPTICAL SYSTEM | | | | | | | | | | | |
| 1 | | | 5.3 | 0.5 | -1.9 | -5.3 | | -0.0216 | 0.0009 | 0.0042 | 0.0216 |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | 0.0 | | | | | | | | | |
| 8 | | 0.0 | | | | | | | | | |
| 9 | | | | | | | -1.0197 | | | | |
| 10 | -1.4 | | | | | | 1.0197 | | | | |
| POST-DEFLECTION OPTICAL SYSTEM | | | | | | | | | | | |
| 11 | | | | | | | 22.0000 (DEFLECTION SURFACE) | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |
| 17 | | | | | | | | | | | |
| 18 | | | | | | | | -1.5144 | 0.0000 | 0.0000 | 0.0000 |
| 19 | | | | | | | | -1.0000 | 0.0000 | 0.0000 | 0.0000 |
| 20 | | | | | | | | | | | |

FIG.41

QUANTITY OF CHANGE FOR TEMPERATURE RISE OF 15 DEGREES

| | BEAM POSITION IN SUB SCANNING DIRECTION | DEFOCUSING IN MAIN SCANNING DIRECTION | DEFOCUSING IN SUB SCANNING DIRECTION | BEAM POSITION (LBO) | $\alpha_H \times LBO \times t$ | QUANTITY OF CHANGE IN RAY4 REFERENCE BEAM SPACING |
|---|---|---|---|---|---|---|
| ray1 | 0.045 | 0.7 | 1.9 | 7.4 | 0.003 | 0.090 |
| ray2 | 0.005 | 0.7 | 2.0 | 0.5 | 0.000 | 0.050 |
| ray3 | −0.017 | 0.7 | 2.0 | 5.1 | −0.002 | 0.028 |
| ray4 | −0.045 | 0.7 | 1.9 | 9.1 | 0.003 | 0.000 |

QUANTITY OF RAY1 SHIFT IN SUB SCANNING DIRECTION − QUANTITY OF RAY4 SHIFT IN SUB SCANNING DIRECTION: 0.090

OPTICAL BEAM SCANNING DEVICE RESTRAINING BEAM POSITION ERROR DUE TO TEMPERATURE CHANGE WITH DIFFRACTION GRATING AND IMAGE FORMING APPARATUS USING THE SAME

BACKGROUND OF THE INVENTION

1. Field of the Invention

The present invention relates to an optical beam scanning device which causes a luminous flux from a light source to scan a photoconductive surface of a photoconductor in the main scanning direction, and particularly a technique to realize improvement in optical characteristics.

2. Description of the Related Art

Traditionally, for an optical beam scanning device which shapes a luminous flux from a light source into a predetermined sectional shape and causes the luminous flux to scan in a predetermined direction, there is known a technique of providing a lens or diffractive optics with negative power that passes luminous fluxes from plural light sources in a pre-deflection optical system, thereby changing the beam spacing in a direction of restraining color shift which occurs in an image forming apparatus having the optical beam scanning device when a temperature change occurs (JP-A-2005-221870).

Also, there is known a technique of providing a diffractive optics which corrects chromatic aberration of magnification in a pre-deflection optical system, thus preventing the length of a scanning line in the main scanning direction from being varied by a change in wavelength (JP-A-2006-171117).

Moreover, a configuration is known in which a scanning optical device having a refraction surface and a diffraction surface is provided in a post-deflection optical system, the radius of curvature in the sub scanning direction on at least one refraction surface of the scanning optical device is continuously changed from the optical axis toward outside in accordance with the main scanning direction, and the diffraction power in the sub scanning direction of at least one diffraction surface is continuously changed from the optical axis toward outside in accordance with the main scanning direction (JP-A-2002-221681).

However, in the technique descried in the JP-A-2005-221870, the number of lenses arranged in the pre-deflection optical system must be increased.

Also, in the techniques described in JP-A-2006-171117 and JP-A-2002-221681, since correction of color shift due to thermal expansion of the image forming apparatus is considered with respect to the sub scanning direction, there is a problem that color shift occurs due to a temperature rise in the image forming apparatus.

SUMMARY OF THE INVENTION

An object of an embodiment of the invention is to provide a technique which enables proper correction of optical characteristics in accordance with changes in the ambient temperature.

To solve the foregoing problem, an optical beam scanning device according to an aspect of the invention is an optical beam scanning device capable of causing a luminous flux from a light source to scan a photoconductive surface of each of plural photoconductors in a main scanning direction. The optical beam scanning device includes: a rotary deflector configured to reflect and deflect an incident luminous flux by plural reflection surfaces arrayed in a direction of rotation, and thereby cause the incident luminous flux to scan in the main scanning direction; and a post-deflection optical system including plural optical devices and configured to guide the luminous flux reflected and deflected by each of the plural reflection surfaces in the rotary deflector, to a photoconductive surface of a photoconductor to which the luminous flux should be guided. Of the plural optical devices forming the post-deflection optical system, in at least one optical device on which a principal ray of the luminous flux which should be guided to each of the plural photoconductors becomes incident at different incident positions from each other in a sub scanning direction orthogonal to the main scanning direction, a diffraction grating is formed at least on one of an incident surface and an exit surface of the luminous flux in the optical device.

Also, an optical beam scanning device according to an aspect of the invention is an optical beam scanning device capable of causing a luminous flux from a light source to scan a photoconductive surface of each of plural photoconductors in a main scanning direction. The optical beam scanning device includes: a rotary deflector configured to reflect and deflect an incident luminous flux by plural reflection surfaces arrayed in a direction of rotation, and thereby cause the incident luminous flux to scan in the main scanning direction; and a post-deflection optical system including plural optical devices and configured to guide the luminous flux reflected and deflected by each of the plural reflection surfaces in the rotary deflector, to a photoconductive surface of a photoconductor to which the luminous flux should be guided. Of the plural optical devices forming the post-deflection optical system, in at least one optical device on which a principal ray of the luminous flux from the light source becomes incident at a different incident position from an optical path of an optical axis of the post-deflection optical system in a sub scanning direction orthogonal to the main scanning direction, a diffraction grating is formed at least on one of an incident surface and an exit surface of the luminous flux in the optical device.

Moreover, an image forming apparatus according to an aspect of the invention includes an optical beam scanning device having the configuration as described above, a photoconductor on which an electrostatic latent image is formed by a luminous flux caused to scan it by the optical beam scanning device, and a developing unit configured to develop the electrostatic latent image formed on the photoconductor.

DESCRIPTION OF THE DRAWINGS

FIG. 9 is a view showing an exemplary defining form to define the shape of lens surface.

FIG. 10 is a view showing optical design data of each optical device in a first example.

FIG. 11 is a data table showing paraxial power of the shared optical device.

FIG. 12 is a data table showing the eccentricity and tilt of each optical device in the first example.

FIG. 13 is a data table of coefficient value.

FIG. 14 is a view showing a coefficient table of optical path difference function.

FIG. 16 is a view for explaining an advantage of the first example.

FIG. 17 is a view showing optical design data of each optical device in a second example.

FIG. 18 is a data table showing paraxial power of a shared optical device.

FIG. 19 is a data table showing the eccentricity and tilt of each optical device in the second example.

FIG. 20 is a data table of coefficient value.

FIG. 21 is a view showing a coefficient table of optical path difference function.

FIG. 23 is a view for explaining an advantage of the second example.

FIG. 24 is a view showing optical design data of each optical device in Example 3.

FIG. 25 is a data table showing paraxial power of each optical device in Example 3.

FIG. 26 is a view showing the eccentricity and tilt applied to each optical device in Example 3.

FIG. 27 is a data table of coefficient value.

FIG. 28 is a view showing a coefficient table of optical path difference function.

FIG. 30 is a view showing the quantity of beam change at the time of a temperature rise in Example 3.

FIG. 31 is a view showing optical design data of each optical device in Example 4.

FIG. 32 is a data table showing paraxial power of each optical device in Example 4.

FIG. 33 is a view showing the eccentricity and tilt applied to each optical device in Example 4.

FIG. 34 is a data table of coefficient value.

FIG. 35 is a view showing a coefficient table of optical path difference function.

FIG. 37 is a view showing the quantity of beam change at the time of a temperature rise in Example 4.

FIG. 38 is a view showing optical design data of each optical device in a comparative example.

FIG. 39 is a data table showing paraxial power of a shared optical device in the comparative example.

FIG. 40 is a view showing the eccentricity and tilt of each optical device in the comparative example.

FIG. 41 is a view showing the quantity of defocusing change or the like at the time of a temperature change in the configuration of the comparative example.

DESCRIPTION OF THE EMBODIMENTS

Hereinafter, embodiments of the invention will be described with reference to the drawings.

Figure 1:
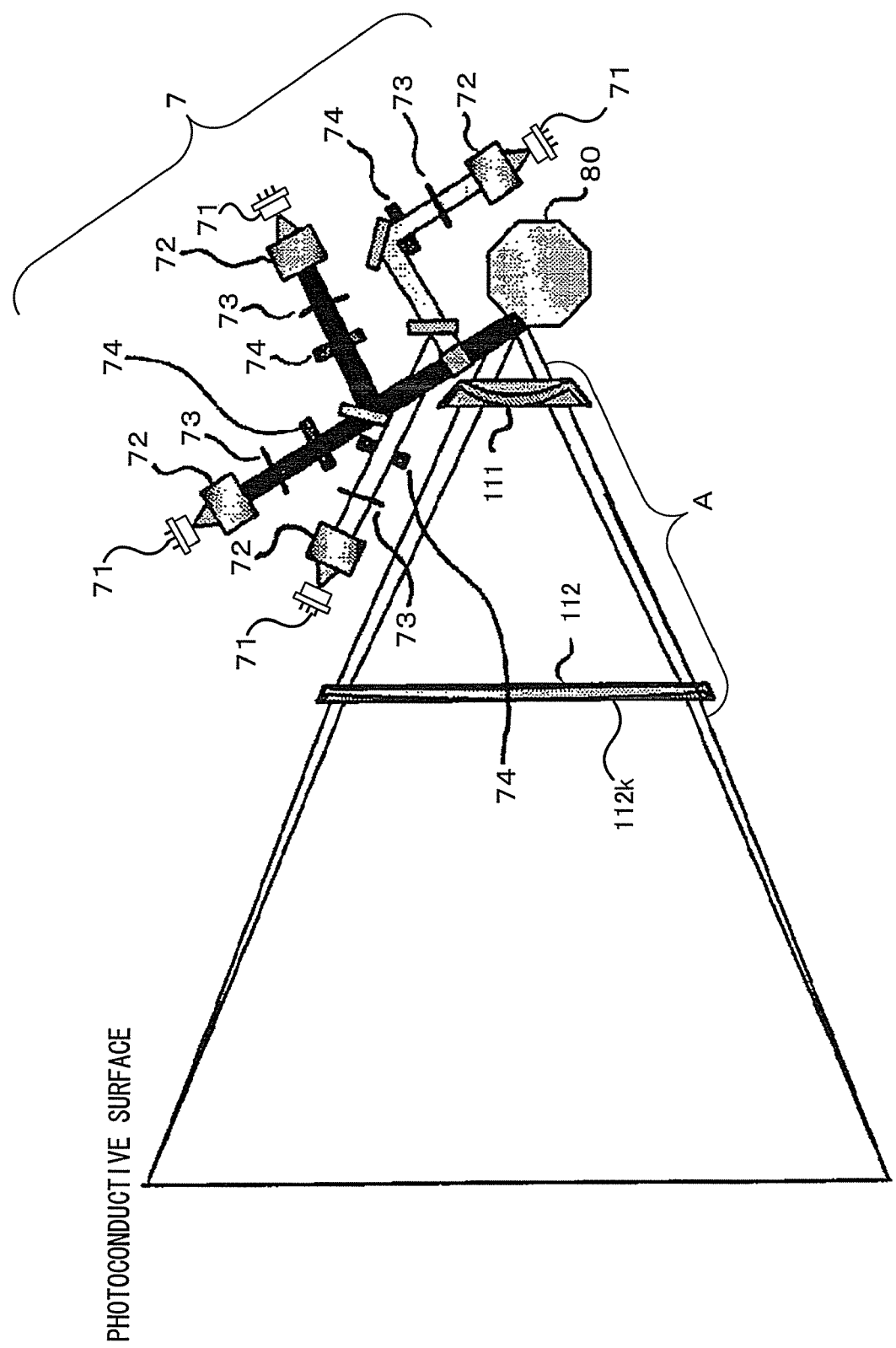
FIG. 1 is a view showing an optical path in an optical system of an optical beam scanning device according to an embodiment of the invention, as viewed from the sub scanning direction.
Figure 2:
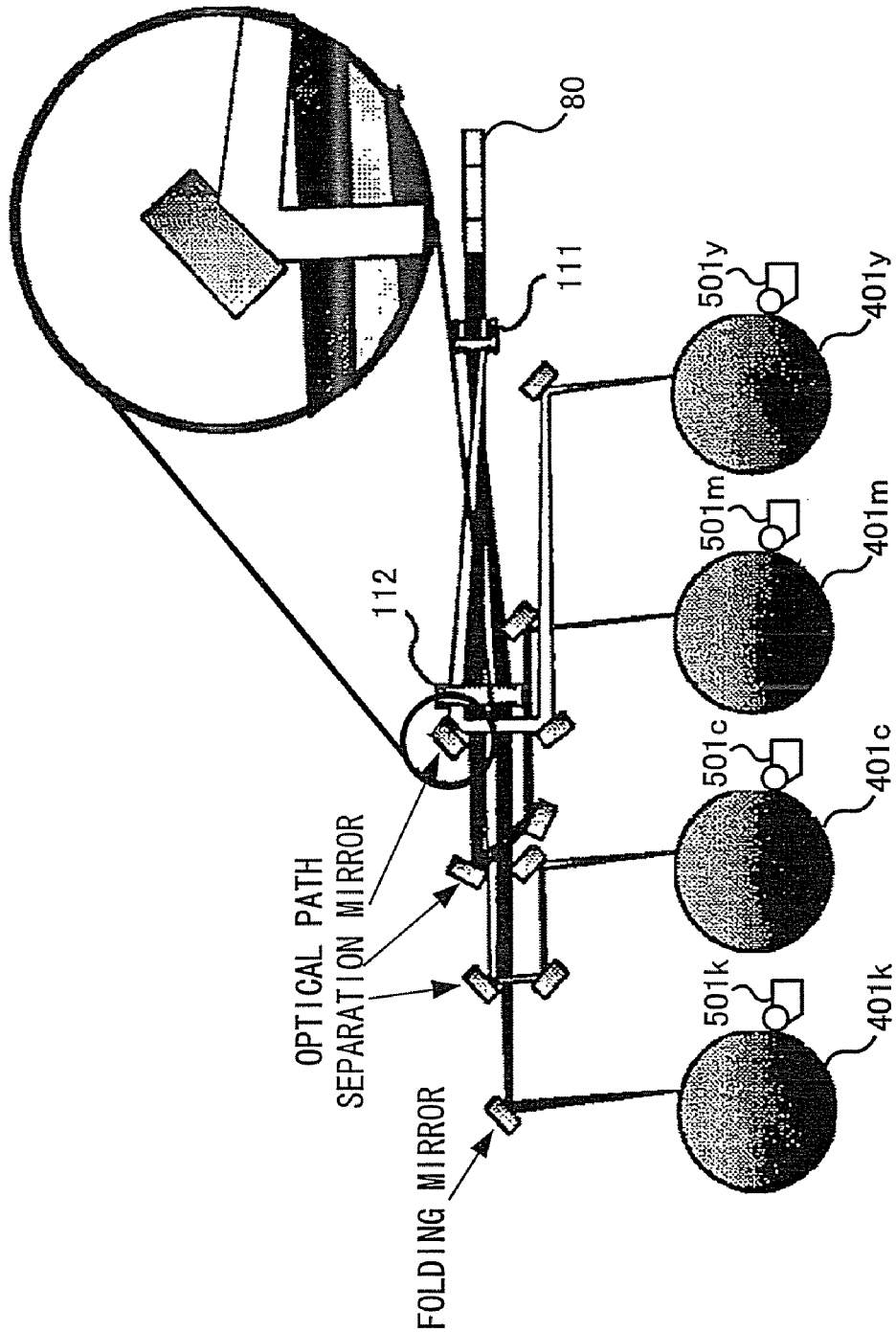
FIG. 2 is a sectional view in the sub scanning direction showing a schematic configuration of an image forming apparatus 900 having the optical beam scanning device according to the embodiment.

FIG. 1 is a view showing an optical path in an optical system of an optical beam scanning device according to an embodiment of the invention, as viewed from the sub scanning direction. FIG. 2 is a sectional view in the sub scanning direction showing a schematic configuration of an image forming apparatus 900 having the optical beam scanning device according to this embodiment.

As shown in FIG. 1 and FIG. 2, an optical beam scanning device 1 according to this embodiment has a pre-deflection optical system 7, a polygon mirror (rotary deflector) 80, and a post-deflection optical system A.

In the optical beam scanning device 1, divergent light from a light source is shaped into a luminous flux having a predetermined sectional shape by the pre-deflection optical system having plural optical devices. The luminous flux shaped by the pre-deflection optical system 7 is deflected by the rotary deflector, and via the post-deflection optical system A, the luminous flux is caused to scan the photoconductive surface of each of plural photoconductors 401*y* to 401*k* in the main scanning direction. The luminous flux caused to scan by the optical beam scanning device 1 forms an electrostatic latent image on the photoconductive surfaces of the photoconductors 401*y* to 401*k*. The electrostatic latent images formed on the respective photoconductors are developed by developing units 501*y* to 501*k* with developers of colors corresponding to the respective photoconductors.

Hereinafter, the optical beam scanning device 1 according to this embodiment will be described in detail.

The polygon mirror 80 reflects and deflects an incident luminous flux by plural reflection surfaces arrayed in the direction of rotation and thereby causes the incident luminous flux to scan in the main scanning direction.

The pre-deflection optical system 7 has light sources 71 formed by LDs, finite-focus lenses (or collimating lenses) 72 which turn divergent light from the light sources 71 into converged light, parallel light or moderately diffused light, apertures 73, and cylinder lenses 74 which condense luminous fluxes near the polygon mirror 80.

With such a configuration, the pre-deflection optical system 7 shapes light from the light sources 71, for example, into luminous fluxes having a predetermined sectional shape elongated in the main scanning direction, then guides the luminous fluxes toward the polygon mirror 80, and condenses the luminous fluxes in the sub scanning direction near the reflection surface of the polygon mirror 80.

The post-deflection optical system A is made of a resin material such as plastics and has an fθ1 lens 111 and an fθ2 lens 112 having free-form surfaces with such power distribution that power changes continuously.

The pre-deflection optical system is arranged at different heights in the sub scanning direction and with different tilts. The post-deflection optical system A guides luminous fluxes on different optical paths to the surfaces of the photoconductors 401*y* to 401*k* corresponding to the respective reflection surfaces.

In the fθ1 lens 111 and the fθ2 lens 112, their curvatures change independently in two directions, that is, the main scanning direction and the sub scanning direction. The fθ1 lens 111 and the fθ2 lens 112 in this case are equivalent to a shared optical device. The power distribution of the fθ lens 110 is set to provide such power that, with respect to all the luminous fluxes that are reflected and deflected by the polygon mirror 80 and should be guided to each of the plural photoconductors 401*y* to 401*k* (all the luminous fluxes that become incident from the plural pre-deflection optical systems and are reflected and deflected), the luminous flux guided to the photoconductive surface by the post-deflection optical system A has predetermined optical characteristics on the photoconductive surface (for example, characteristics which satisfy predetermined conditions for the beam diameter of the luminous flux, the degree of curving of the scanning line, the position of the luminous flux with respect to the scanning range and so on) in accordance with the incident position of the luminous flux. In this manner, the shared optical device has a smooth lens surface which acts on all the luminous fluxes that are made incident by the plural pre-deflection systems having optical axes with different passing positions in the sub scanning, then reflected and deflected by the polygon mirror 80 and become incident at different positions from each other in the sub scanning direction.

In this manner, a part of the optical devices which are generally provided independently for each photoconductor in a traditional technique is arranged collectively as a shared optical device, and all the luminous fluxes that should be guided to the plural photoconductors are given power by the shared optical device. This can contribute to reduction in the space for arranging optical components in the sub scanning direction. Also, since the number of optical components that should be arranged can be reduced, deterioration in optical characteristics due to misalignment or the like of each optical component can be avoided and it also can contribute to reduction in cost.

The "predetermined optical characteristics" in this case means optical characteristics which are desirable in forming an electrostatic latent image on the photoconductive surface of the photoconductor.

Since the share optical device is thus formed by plural lenses, the curvature of the lens surface of each lens can be moderately set, compared with the case where it is formed by one lens. The processing becomes easier and it can contribute to reduction in manufacturing cost and improvement in processing accuracy (improvement in optical characteristics).

In the case where the shared optical device is formed by the fθ1 lens 111 and the fθ2 lens 112, for example, continuously changing power distribution can be set for both the incident surface and the exit surface of each of the fθ1 lens 111 and the fθ2 lens 112. However, such power distribution need not necessarily be set for all the lens surfaces of the shared optical device. Generally, in the case where the shared optical device is formed by plural lenses in this manner, the lens situated downstream in the traveling direction of the luminous flux has a larger size in most cases. That is, a luminous flux incident on the lens on the downstream side in the traveling direction of the luminous flux has a smaller beam diameter and a larger moving distance at the same deflection angle than a luminous flux on the lens situated upstream. Therefore, it is considered to have a larger effect of setting power distribution which continuously changes as described above. Thus, in the case where the shared optical device as described above is formed by plural lenses, it is preferable that continuously changing power as described above should be given to the exit side of the lens situated on the most downstream side in the traveling direction of the luminous flux (that is, the closest to the image surface).

Figure 3:
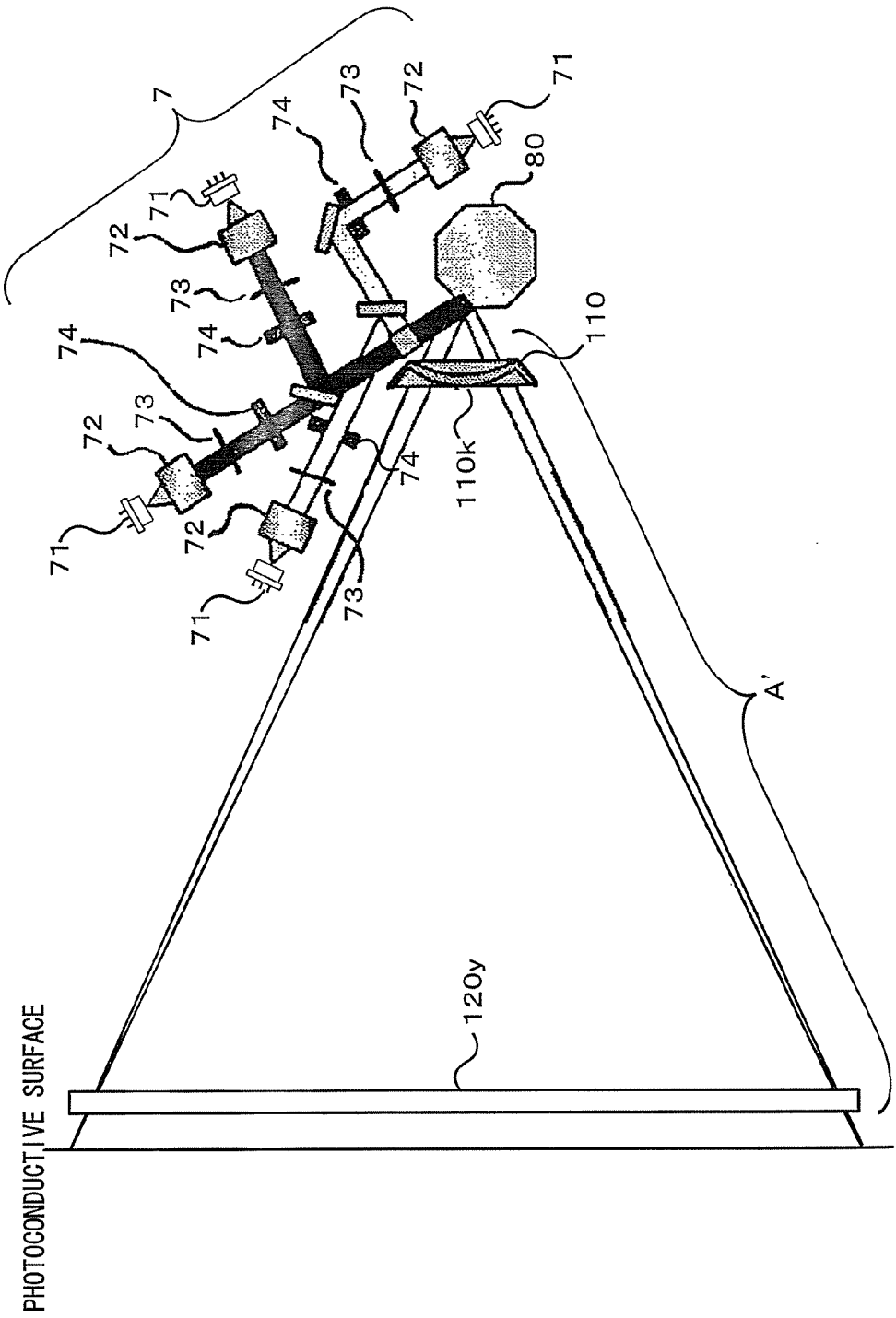
FIG. 3 is a view showing an example of a post-deflection optical system A' in which a shared optical device is formed by one fθ lens 110.
Figure 4:
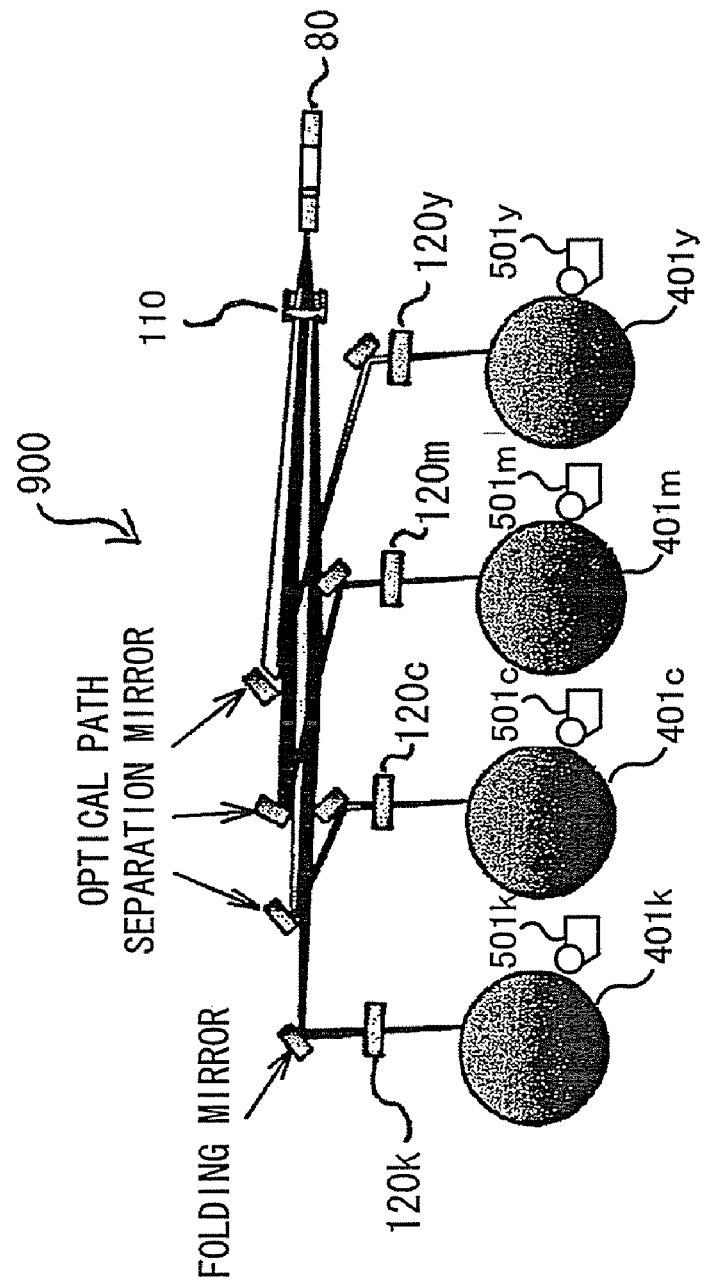
FIG. 4 is a view showing an example of a post-deflection optical system A' in which a shared optical device is formed by one fθ lens 110.

In FIG. and FIG. 2, the configuration in which the shared optical device is formed by two fθ lenses is shown. However, the shared optical device is not limited to this and the shared optical device can be formed by one fθ lens. FIG. 3 and FIG. 4 are views showing an example of the post-deflection optical system A' in which the shared optical device is formed by one fθ lens 110. In the configuration shown in FIG. 3 and FIG. 4, cylinder lenses 120*y* to 120*k* are additionally provided, which are provided on the optical path between the shared optical device and each photoconductor in accordance of each of the photoconductors 401*y* to 401*k*, have a convex surface on the incident side, and have positive power.

The power distribution of the fθ lens 110 of the configuration shown in FIGS. 3 and 4 is set to provide such power that, with respect to all the luminous fluxes that are reflected and deflected by the polygon mirror 80 and should be guided to each of the plural photoconductors 401*y* to 401*k* (all the luminous fluxes that become incident from the plural pre-deflection optical systems having different angles in the sub scanning direction and different heights and are reflected and deflected), the luminous flux guided to the photoconductive surface by the post-deflection optical system A has predetermined optical characteristics on the photoconductive surface (for example, characteristics which satisfy predetermined conditions for the beam diameter of the luminous flux, the degree of curving of the scanning line, the position of the luminous flux with respect to the scanning range and so on) in accordance with the incident position of the luminous flux and in cooperation with the cylinder lenses 120y to 120k acting on the rays guided to the individual photoconductors. Also, in the example shown in FIG. 3 and FIG. 4, a diffraction grating is formed on an exit surface 110k of the fθ lens 110.

In this manner, as the shared optical device is formed by one lens, the number of components of the optical system can be reduced, compared with the configuration using plural fθ lenses, and it can contribute to reduction in cost.

Next, the shared optical device in the post-deflection optical system A of the optical beam scanning device (see FIG. 1 and FIG. 2) according to this embodiment will be described in detail.

A diffraction grating is formed on an exit surface 112k of the luminous flux in the fθ2 lens 112 in this case.

Of the plural optical devices forming the post-deflection optical system, the fθ2 lens 112 in this case is a plastic lens on which principal rays of the respective luminous fluxes from the plural light sources 71 become incident at different incident positions from each other in the sub scanning direction orthogonal to the main scanning direction. It suffices as long as the luminous fluxes from the respective light sources that become incident on the fθ2 lens 112 become incident at different incident positions from each other in the sub scanning direction. A configuration may be employed in which one of the plural luminous fluxes travels through the optical axis of the post-deflection optical system and becomes incident. As the diffraction grating is thus formed on the optical device on which luminous fluxes from the respective light sources become incident at different positions from each other in the sub scanning direction, it is possible to make relative adjustment of spacing and adjustment of angle between the respective luminous fluxes in accordance with a temperature change.

In the case where only a single luminous flux from one light source is caused to scan, it is preferable that the optical device on which a diffraction grating should be formed is the fθ2 lens 112, which is the optical device on which principal rays of the luminous fluxes from the light sources become incident at different incident positions from the optical path of the optical axis of the post-deflection optical system A in the sub scanning direction orthogonal to the main scanning direction, of the plural optical devices forming the post-deflection optical system A. Basically, the exit angle cannot be changed for a luminous flux that travels through the optical axis and becomes incident. Therefore, in order to correct chromatic aberration in accordance with a temperature change by using a diffraction grating, it is necessary to cause the luminous flux to become incident at a position that is at least different from the optical axis.

The diffraction grating formed on the exit surface 112k of the fθ2 lens 112 has power in the sub scanning direction and this can restrain occurrence of "longitudinal chromatic aberration" and "traverse chromatic aberration". Here, "traverse chromatic aberration" is equivalent to chromatic aberration of magnification, and "longitudinal chromatic aberration" is equivalent to chromatic aberration generated in the direction of the optical axis (that is, the focal point or the position of the image point on the axis differs depending on the wavelength).

The diffraction grating formed on the fθ2 lens 112 need not always have power in the sub scanning direction. A diffraction grating having power only in the main scanning direction may also be employed. In the case where a diffraction grating having power only in the main scanning direction is thus used as the diffraction grating formed on the fθ2 lens 112, occurrence of "longitudinal chromatic aberration" in the main scanning direction can be restrained (the quantity of defocusing can be reduced).

Of course, in consideration of the manufacturing cost and the number of process steps, the diffraction grating formed on the fθ2 lens 112 may have a configuration which provides power both in the main scanning direction and the sub scanning direction.

Also, since the fθ2 lens 112 having an incident surface and an exit surface formed as curves surfaces is employed as the optical device on which the diffraction grating is formed, it becomes possible to improve wavefront aberration on the image surface while correcting the beam position and defocusing in accordance with a temperature change (temperature compensation). Of course, the lens surface maybe flat if such characteristics can be realized in design.

Next, the optical characteristics set for the diffraction grating formed on the fθ lens as described above will be described in detail.

Figure 5:
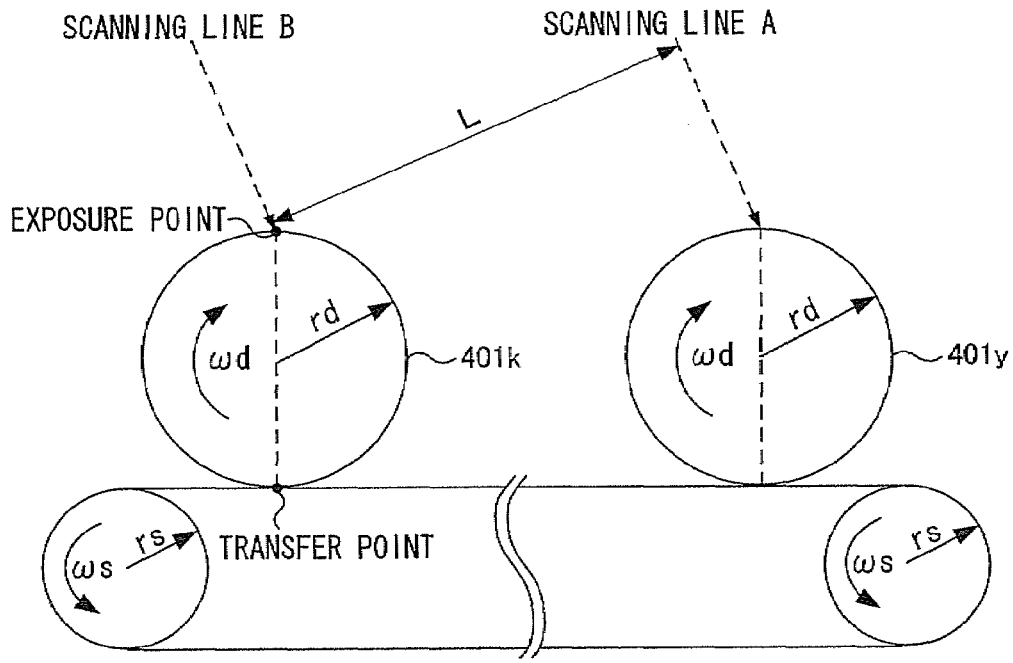
FIG. 5 is a view for explaining registration shift in the image forming apparatus 900 due to a change in ambient temperature.
Figure 6:
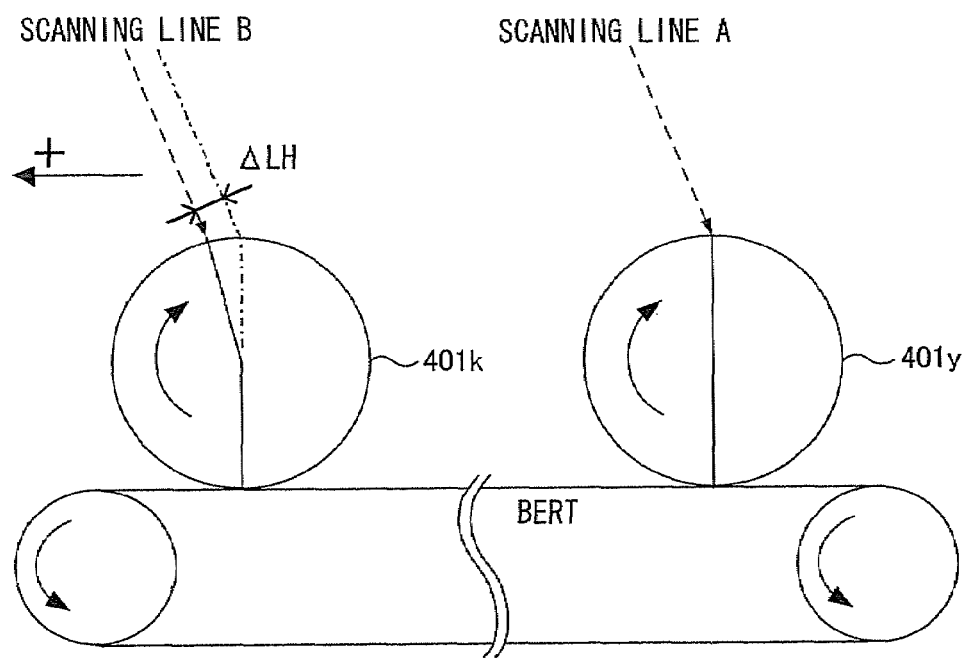
FIG. 6 is a view for explaining registration shift in the image forming apparatus 900 due to a change in ambient temperature.
Figure 7:
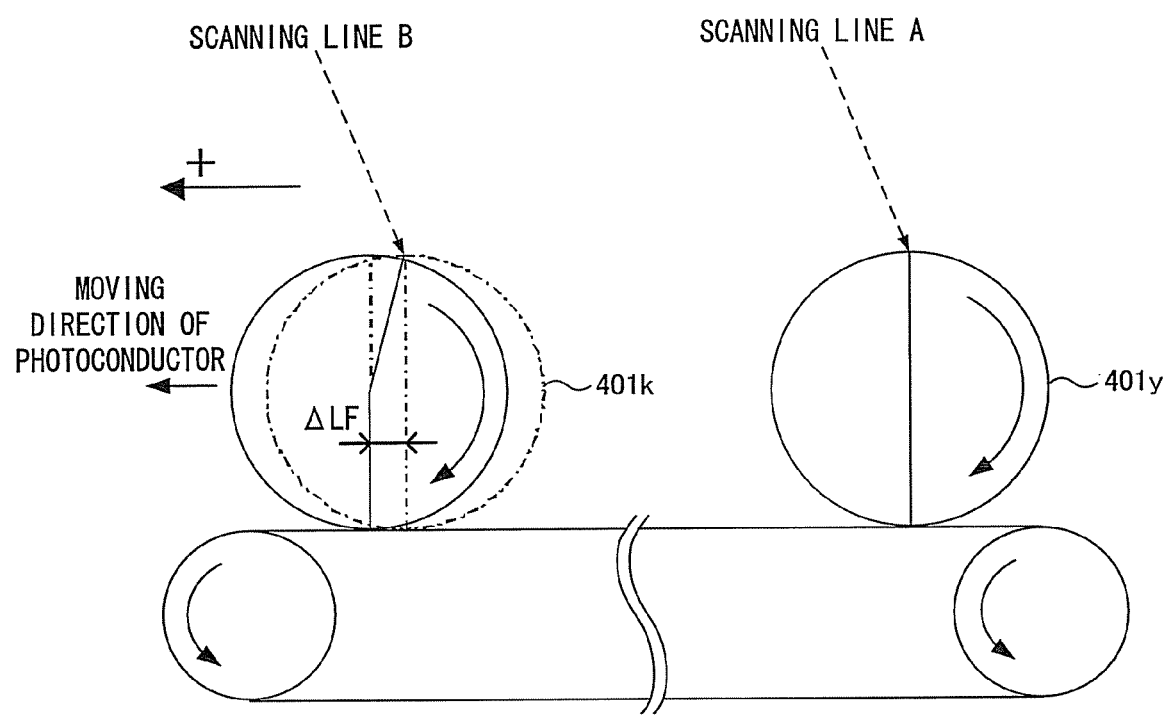
FIG. 7 is a view for explaining registration shift in the image forming apparatus 900 due to a change in ambient temperature.

FIG. 5 to FIG. 7 are views for explaining registration shift in the image forming apparatus 900 due to a change in ambient temperature. In FIG. 5 to FIG. 7, the positional relation of the photoconductors 401k and 401y is described as an example.

Here, in FIG. 5 to FIG. 7, if
Spacing between rays: L
Radius of photoconductive drum: $r_d$
Rotation speed of photoconductive drum: $\omega_d$
Radius of transfer belt driving shaft: $r_s$
Angular velocity of rotation of transfer belt driving shaft: $\omega_s$
Angle between a straight line defining the spacing of rays and a straight line connecting drums: γ are given, the relation expressed by the equation (1) holds.

$$r_d \times \omega_d \approx r_s \times \omega_s = v \tag{1}$$

In this case, in order to superimpose images at the same position, exposure is carried out with a time difference of $$T = L/\cos\gamma/(r_s \times \omega_s) \tag{2}$$

between the timing of writing by a scanning line A and the timing of writing by a scanning line B.

First, the influence of change in the position of the scanning line will be considered.

When the spacing between rays shifts by $\Delta L_H$, the time when the image written on the photoconductor by the scanning line B reaches the transfer point is delayed by $$\Delta T = \Delta L_H / \cos\gamma / v \approx \Delta L_H / \cos\gamma / v \tag{3}$$

(see FIG. 6). If this is expressed by the positional relation of images formed on the belt, the image formed by the scanning line B is shifted rearward (to the right in FIG. 6) by $$v \times \Delta T \approx \Delta L_H / \cos\gamma \tag{4}$$

Next, the influence of change in the position of the photoconductor will be considered.

When the spacing between photoconductors shifts by $\Delta L_F$, the time when the image written by the scanning line B reaches the transfer point is delayed by $$\Delta T = -\Delta L_F / v \tag{5}$$

Influenced by this, the image formed by the scanning line B is shifted rearward (to the left in FIG. 7) by $$v \times \Delta T = -\Delta L_F \tag{6}$$

(Since the sign is negative, the image by the scanning line B shifts leftward by $\Delta LD$). As the transfer point also shifts leftward by $\Delta L_F$, the image by the scanning line B shifts rearward (to the right in FIG. 7) by $$-2 \times \Delta L_F \quad (7)$$

in total (Since the sign is negative, the image by the scanning line B shifts leftward by $2 \times \Delta L_F$).

Next, the influence of change in the radius of the shaft will be considered.

When the radius of the shaft increases by $\Delta r_s$, v becomes faster by $\Delta r_s \omega_s$. Therefore, the distance the belt travels (or a medium carried on the belt) in the same time T increases by $$\Delta r_s \omega_s T = \Delta r_s / r_s \times L / \cos \gamma \quad (8)$$

The image by the scanning line B shifts rearward (to the right in FIG. 7) by $$\Delta r_s / r_s \times L / \cos \gamma \quad (9)$$

If the above equations (4), (7) and (9) are added in order to consider the influence of all of the "change in the position of the scanning line", "change in the position of the photoconductor" and "change in the radius of the shaft", a shift by $$\Delta L_H / \cos \gamma - 2 \times \Delta L_F + \Delta r_s / r_s \times L / \cos \gamma \quad (10)$$

is generated.

When the composite coefficients of linear expansion (composite coefficients of thermal expansion) of the housing in the image forming apparatus 900, the frame which supports which photoconductor and prescribes the positional relation between the respective photoconductors, and the driving shaft which drives the belt, are expressed by $\alpha_H$, $\alpha_F$ and $\alpha_S$, and the temperature rise is expressed by t, $$\Delta L_H = \alpha_H \times L \times t \quad (11)$$

$$\Delta L_F = \alpha_F \times L \times t / \cos \gamma \quad (12)$$

$$\Delta r_s = \alpha_S \times r_s \times t \quad (13)$$

hold. As these equations (11) to (13) are substituted into the equation (10), a shift by $$\alpha_H \times L \times t / \cos \gamma - 2 \times \alpha_F \times L \times t / \cos \gamma + \alpha_S \times r_s \times t / r_s \times L / \cos \gamma = (\alpha_H - 2 \times \alpha_F + \alpha_S) / \cos \gamma (L \times t) \quad (14)$$

is found (the positive sign indicates rearward shift (to the right in FIG. 7)).

To cancel this at the position on the scanning line B, the scanning line B can be moved by a distance of the same absolute amount with the opposite sign to the equation (14), as is clear from the equation (4). That is, $$-(\alpha_H - 2 \times \alpha_F + \alpha_S) \times (L \times t) \quad (15).$$

This means the pitch between beams is set at $-(\alpha_H - 2\alpha_F + \alpha_S) \times (L \times t)$. That is, instead of not moving the beam position, the beam position can be moved by the amount expressed by the equation (15) to prevent shift on the image even in the case where a temperature change occurs.

The expansion of the optical housing and the change in the spacing between the scanning lines due to the thermal expansion of the optical housing, which are assumed as described above, become equal in the case where the pitch between beams in the sub scanning direction expands by $\alpha_H \times LB \times t$ (here, LB represents the spacing between sub scanning beam positions on the image surface in the case where optical path folding is developed from the deflection surface to the image surface).

Therefore, if the beam position on the surface to be scanned in the case where the folding mirror is developed can be shifted by $$-(\alpha_H - 2 \times \alpha_F + \alpha_S) \times (L \times t) + \alpha_H \times LB \times t \quad (16),$$

occurrence of shift in color superimposition due to a temperature change can be prevented and the quantity of color shift with no registration control can be restrained. Also, the time interval of executing registration control can be made longer.

Now, in the case where the composite coefficients of linear expansion (composite coefficients of thermal expansion) of the housing which supports the plural optical devices forming the optical beam scanning device in the image forming apparatus 900, the frame which supports which photoconductor and prescribes the positional relation between the respective photoconductors, and the driving shaft which drives the belt, are expressed by $\alpha_H$, $\alpha_F$ and $\alpha_S$, the temperature rise is expressed by t, and the pitch between scanning lines is expressed by L, if the temperature rises by t degrees, a shift by $$(\alpha_H - 2 \times \alpha_F + \alpha_S) \times (L \times t) \quad (17)$$

occurs. As the configuration of this embodiment is employed and the beam position on the surface to be scanned in the case where the folding mirror is developed is thus shifted by $$-(\alpha_H - 2 \times \alpha_{F+\alpha_S}) \times (L \times t) + \alpha_H \times LB \times t \quad (18)$$

in accordance with the temperature change, occurrence of shift in color superimposition due to the temperature change can be prevented and the quantity of color shift with no registration control can be restrained. Also, the frequency of executing registration control can be reduced.

In this manner, in the case where a luminous flux pass through a position away from the optical axis, as optimum optical power arrangement is made with respect to the refraction lens and the diffraction lens (lens having such a shape that a diffractive optics surface is added to the refraction lens surface) in the post-deflection optical system, the beam position in the sub scanning direction can be changed in a way to cancel color shift due to thermal expansion of the image forming apparatus. Moreover, as the optimum optical power arrangement is made, it is also possible to provide an optical system in which temperature dependence of the image forming surface in the main scanning direction is reduced.

Next, specific examples of the invention will be described. In the following examples, the optical system having two f$\theta$ lenses shown in FIG. 1 and FIG. 2 is employed.

EXAMPLE 1

First, Example 1 of the invention will be described.
In the case where
Material of optical system housing: aluminum diecast (coefficient of linear expansion $\alpha_H = 2.1 \times 10^{-5}$)
Material prescribing the spacing between photoconductors: aluminum diecast (coefficient of linear expansion $\alpha_F = 2.1 \times 10^{-5}$)
Material of transfer belt driving shaft: free-cutting steel (coefficient of linear expansion $\alpha_S = 1.15 \times 10^{-5}$)
Spacing between rays incident on photoconductors at both ends (photoconductor 401k and photoconductor 401y): L=225 mm Temperature rise: t=15 degrees
are given, an ideal quantity of change in the distance between beams at both ends in the sub scanning direction is defined as $$-(\alpha_H - 2 \times \alpha_F + \alpha_S) \times (L \times t) + \alpha_H \times LB \times t = 0.038 \quad (19).$$

(This means that in the case where a temperature change occurs and the position of rays in the sub scanning direction is not shifted at all, a shift in color superimposition by 38 µm/cos γ occurs.)

Figure 8:
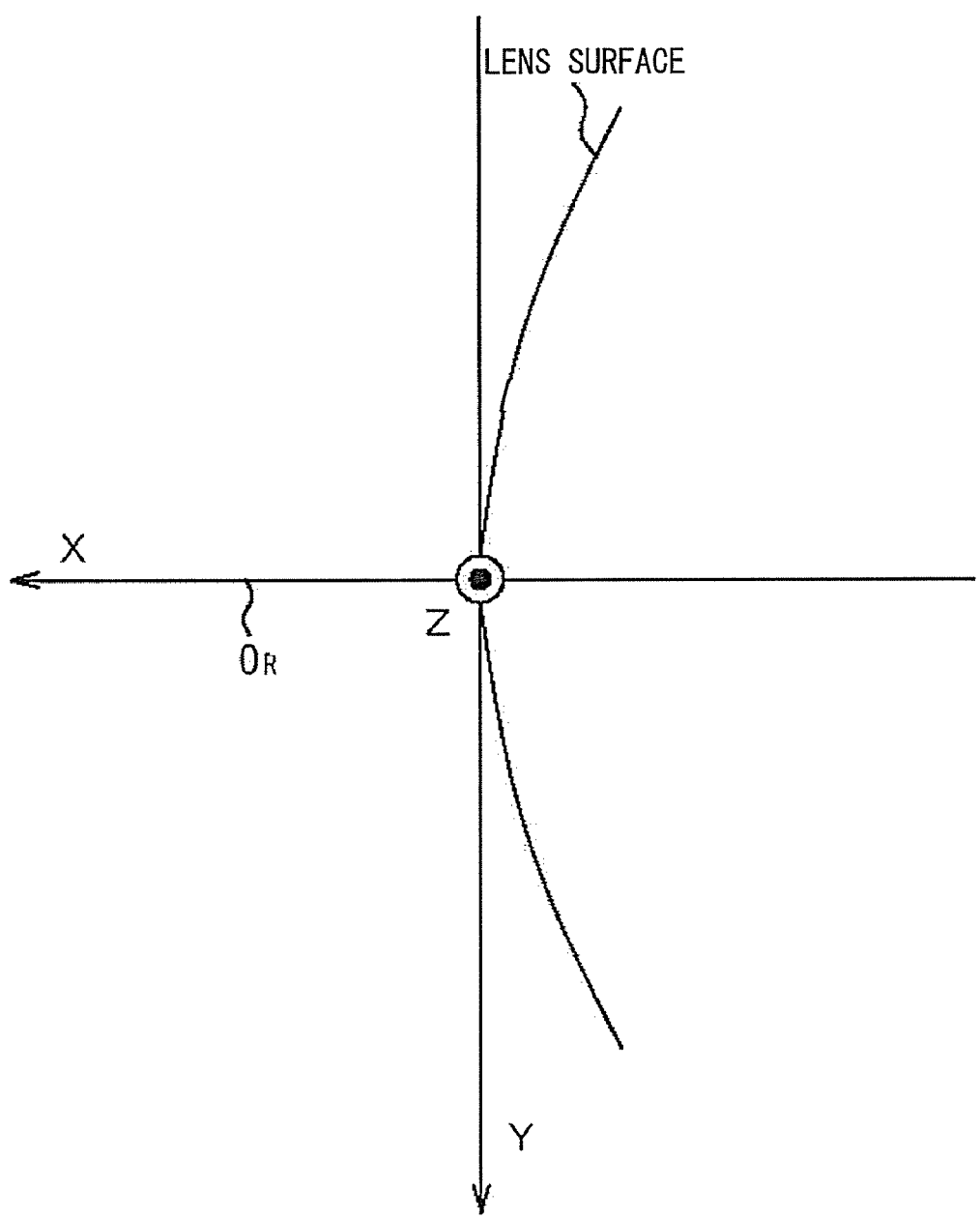
FIG. 8 is a view showing an exemplary coordinate system to define the shape of lens surface.

The shape of the refraction lens surface of the optical device 79 is expressed by, for example, a shape defining form as shown in FIG. 9 in the case where the shape of the lens surface is expressed by a coordinate system as shown in FIG. 8. In the defining form shown in FIG. 9, ay=1 and az=1 are employed in this example.

Also, the optical path difference function which prescribes the pattern of the diffraction grating formed in the optical device 79 is expressed by the following polynomial.

$$\Phi = \Sigma c_{lm} x y^l x z^m \quad (20)$$

In the first example, a diffraction surface is provided on the exit surface 112k of the free-form surface lens (fθ2 lens 112) on the image surface side in the post-deflection optical system A. FIG. 10 is a view showing optical design data of each optical device in the first example. FIG. 11 is a data table showing paraxial power of the shared optical device. FIG. 12 is a data table showing the eccentricity and tilt of each optical device in the first example. FIG. 13 is a data table of coefficient value. FIG. 14 is a view showing a coefficient table of optical path difference function. The design wavelength of the diffractive optics is 780 nm and the material of the lens is COP (cyclo-olefin polymer).

As shown in FIG. 11, both the fθ1 lens 111 and the fθ2 lens 112 have positive power in the sub scanning direction, and the power of the diffraction grating on the exit surface 112k of the fθ2 lens 112 is set to be positive, too. Also, both the fθ1 lens 111 and the fθ2 lens 112 have positive power in the main scanning direction, and the power of the diffraction grating on the exit surface 112k of the fθ2 lens 112 is set to be "negative" in the main scanning direction and "positive" in the sub scanning direction.

The letter v shown in FIG. 11 is equivalent to the Abbe constant defined on the basis of the refractive index in the case where the temperature changes by ±15 degrees and the value of a wavelength change of the laser diode.

The value for the refraction lens $$v=(n(\text{refractive index for 25 degrees})-1)/(n(\text{refractive index for 10 degrees})-n(\text{refractive index for 45 degrees}))=166.3609 \quad (21)$$

The value for the diffraction lens $$v=\lambda(\text{wavelength for 25 degrees})/(\lambda(\text{wavelength for 10 degrees})-\lambda(\text{wavelength for 45 degrees}))=-92.8571 \quad (22)$$

Σφ/v shown in FIG. 11 is the sum of φ/v of the fθ1 lens 111 and the fθ2 lens 112 of the post-deflection optical system and the diffraction grating on the exit surface 112k of the fθ2 lens 112.

The condition for on-axis achromatism in order to prevent defocusing from shifting is Σφ/v=0 (φ=1/f indicates power) including the lens of the post-deflection optical system. Since the refraction lens and the diffraction lens have different signs of v, the value Σφ/v related to on-axis achromatism can be set freely to a certain extent.

Also with respect to traverse chromatic aberration (the quantity of change in image height due to temperature change in sub scanning), since the power of the lens surface having the diffraction grating formed thereon in the post-deflection optical system is positive, the positive power of the refraction lens is weakened. As the refraction lens and the diffraction lens have the opposite signs of v (which indicates that when the refraction lens and the diffraction lens have the same sign, the direction of change in refractive power in the case where the temperature changes becomes opposite), it functions to restrain the quantity of change in the exit angle of luminous flux due to temperature change.

A part of these optical components area arranged with eccentricity and tilt (see FIG. 12). Eccentricity and tilt are provided on the first surface shown in FIG. 12. Thus, in the free-form surface lens with the diffractive optics added thereto (fθ2 lens 112), the height and angle of incidence of each ray differs. Utilizing the difference in refractive power and in the rate of change of refractive power at the time of temperature change due to this difference in height and angle of incidence, the quantity of change in the beam position in the sub scanning direction on the image surface is caused to have a predetermined value.

Figure 15:
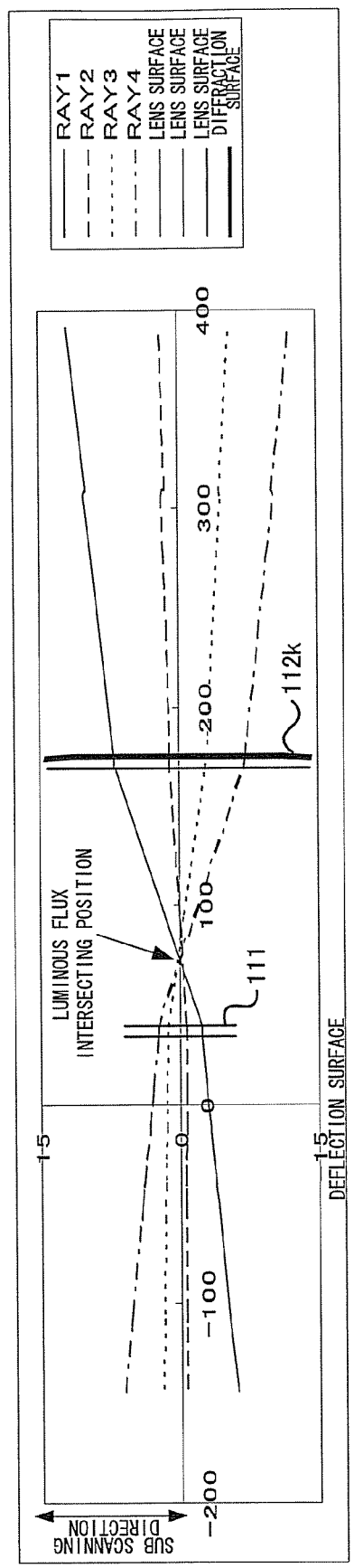
FIG. 15 is a view showing a cross-section in the sub scanning direction of a principal ray of each of plural luminous fluxes exiting from plural light sources 71, an fθ1 lens, and an fθ2 lens with a diffraction grating surface added to its exit side, in Example 1.

FIG. 15 is a view showing a cross-section in the sub scanning direction of principal rays of RAY1, RAY2, RAY3 and RAY4, which are plural luminous fluxes exiting from the plural light sources 71, the fθ1 lens, and the fθ2 lens with the diffraction grating surface added to its exit side in Example 1 (the view enlarged in the sub scanning direction). As can be seen from FIG. 15, in the post-deflection optical system in Example 1, the luminous fluxes reflected and deflected by the plural reflection surfaces of the polygon mirror 80 are caused to intersect each other in the sub scanning direction between the fθ1 lens 111 and the fθ2 lens 112.

If a distance between rays is to be provided that is enough to pass plural rays through the post-deflection optical system and separate the rays by the separation mirror, the distance between the respective rays must be secured to a certain extent in the post-deflection optical system. On the other hand, if the rays are caused to pass through a composite principal point in the sub scanning direction in the post-deflection optical system, they are less likely to be affected by temperature change. If an optimum design is made, in the configuration with two fθ lenses, both of the two fθ lenses have positive power in the sub scanning direction and the principal point is situated between the two lenses. Thus, if, in the post-deflection optical system, the guided plural rays are caused to pass through the principal point in the sub scanning direction and the distance between rays is to be secured on the image surface side, the optical paths as shown in FIG. 15 are employed.

Also, in this example, since a configuration is employed with respect to the sub scanning direction in which incident luminous fluxes from the pre-deflection optical system to the polygon mirror 80 are condensed near the reflection surface (a conjugate relation is made in the sub scanning direction with the reflection surfaces of the polygon mirror 80 and the photoconductive surfaces of the photoconductors), shift of beam position in the sub scanning direction due to inclination of each reflection surface of the polygon mirror is restrained (correction of optical face tangle error). In this configuration, if the luminous fluxes are to be guided to the photoconductors without intersection between the fθ1 lens 111 and fθ2 lens 112, the tilt angle of each luminous flux to the optical axis increases and refraction on the lens surface increases. Such large refraction becomes a cause of increase in various aberrations. Thus, as the luminous fluxes are caused to intersect each other between the fθ1 lens 111 and fθ2 lens 112 as described above, the deflected luminous fluxes are guided to the photoconductors through optical paths which are as close to the optical axis as possible, and optical paths which minimize refraction on the lens surface are provided.

As shown in FIG. 16, it can be understood that the beam spacing between RAY1 (ray for Y) and RAY4 (ray for K) moves in the expanding direction by 25 µm with a temperature rise of 15 degrees. Since it moves in the direction to cancel the quantity of registration shift (38 μm/cos γ) in the case where the rays are not shifted, only a shift in color superimposition by 13 μm/cos γ occurs between yellow and black with the temperature rise of 15 degrees.

Moreover, the quantity of defocusing change in the main scanning direction is restrained substantially to zero (see FIG. 16). Also the quantity of defocusing change in the sub scanning direction at the time of temperature change is lower than in the configuration of a comparative example which will be described later.

As for the relation between RAY2 and RAY4, L=75×2=150 holds and the beam spacing moves by 11 μm into the direction to cancel the quantity of registration shift (25 μm/cos γ) in the case where the rays are not shifted. Thus, the shift is 14 μm/cos γ. Also for RAY3 and RAY4, L=75 holds and the beam spacing moves in the by 10 μm into the direction to cancel the quantity of registration shift (13 μm/cos γ) in the case where the rays are not shifted. Thus, the shift can be restrained to 3 μm/cos γ.

EXAMPLE 2

Next, Example 2 will be described.
In the case where
Material of optical system housing: aluminum diecast (coefficient of linear expansion $\alpha_H$=2.1×10$^{-5}$)
Material prescribing the spacing between photoconductors: aluminum diecast (coefficient of linear expansion $\alpha_F$=2.1×10$^{-5}$)
Material of transfer belt driving shaft: aluminum (coefficient of linear expansion $\alpha_S$=2.1×10$^{-5}$)
Spacing between rays incident on photoconductors at both ends (photoconductor 401k and photoconductor 401y): L=225 mm Temperature rise: t=15 degrees
are given, an ideal quantity of change in the distance between beams at both ends in the sub scanning direction is defined as $$-(\alpha_H - 2\times\alpha_F + \alpha_S)\times(L\times t) + \alpha_H \times LB \times t = 0.007 \quad (23)$$

(This means that in the case where a temperature change occurs and the position of rays in the sub scanning direction is not shifted at all, a shift in color superimposition by 7 μm/cos γ occurs.)

The shape of the refraction lens surface of the optical device 79 is expressed by, for example, a shape defining form as shown in FIG. 9 in the case where the shape of the lens surface is expressed by a coordinate system as shown in FIG. 8. In the defining form shown in FIG. 9, ay=1 and az=1 are employed in this example.

Also, the optical path difference function which prescribes the pattern of the diffraction grating formed in the optical device 79 is expressed by the following polynomial.

$$\Phi = \Sigma c_{l,m} xy^l xz^m \quad (24)$$

Also in the second example, a diffraction surface is provided on the exit surface 112k of the free-form surface lens (fθ2 lens 112) on the image surface side in the post-deflection optical system A. FIG. 17 is a view showing optical design data of each optical device in the second example. FIG. 18 is a data table showing paraxial power of the shared optical device. FIG. 19 is a data table showing the eccentricity and tilt of each optical device in the second example. FIG. 20 is a data table of coefficient value. FIG. 21 is a view showing a coefficient table of optical path difference function. The design wavelength of the diffractive optics is 780 nm and the material of the lens is COP (cyclo-olefin polymer).

As shown in FIG. 18, both the fθ1 lens 111 and the fθ2 lens 112 have positive power in the sub scanning direction, and the power of the diffraction grating on the exit surface 112k of the fθ2 lens 112 is set to be negative. Also, both the fθ1 lens 111 and the fθ2 lens 112 have positive power in the main scanning direction, and the power of the diffraction grating on the exit surface 112k of the fθ2 lens 112 is set to be "negative" both in the main scanning direction and in the sub scanning direction.

With respect to traverse chromatic aberration (the quantity of change in image height due to temperature change in sub scanning), since the power of the diffraction grating on the exit surface 112k of the fθ2 lens 112 in the post-deflection optical system is "negative" unlike the one in Example 1, even if the absolute value of the refraction angle on the fθ1 lens decreases and the absolute values of the height and tilt of the rays incident on the fθ2 lens decrease when the temperature rises, the absolute value of the refraction angle of the rays on the fθ2 lens decreases further and therefore the position of the rays on the image surface does not largely change.

Eccentricity and tilt are provided on the first surface shown in FIG. 19. Thus, in the free-form surface lens with the diffractive optics added thereto (fθ2 lens 112), the height and angle of incidence of each ray differs. Utilizing the difference in refractive power and in the rate of change of refractive power at the time of temperature change due to this difference in height and angle of incidence, the quantity of change in the beam position in the sub scanning direction on the image surface is caused to have a predetermined value.

Figure 22:
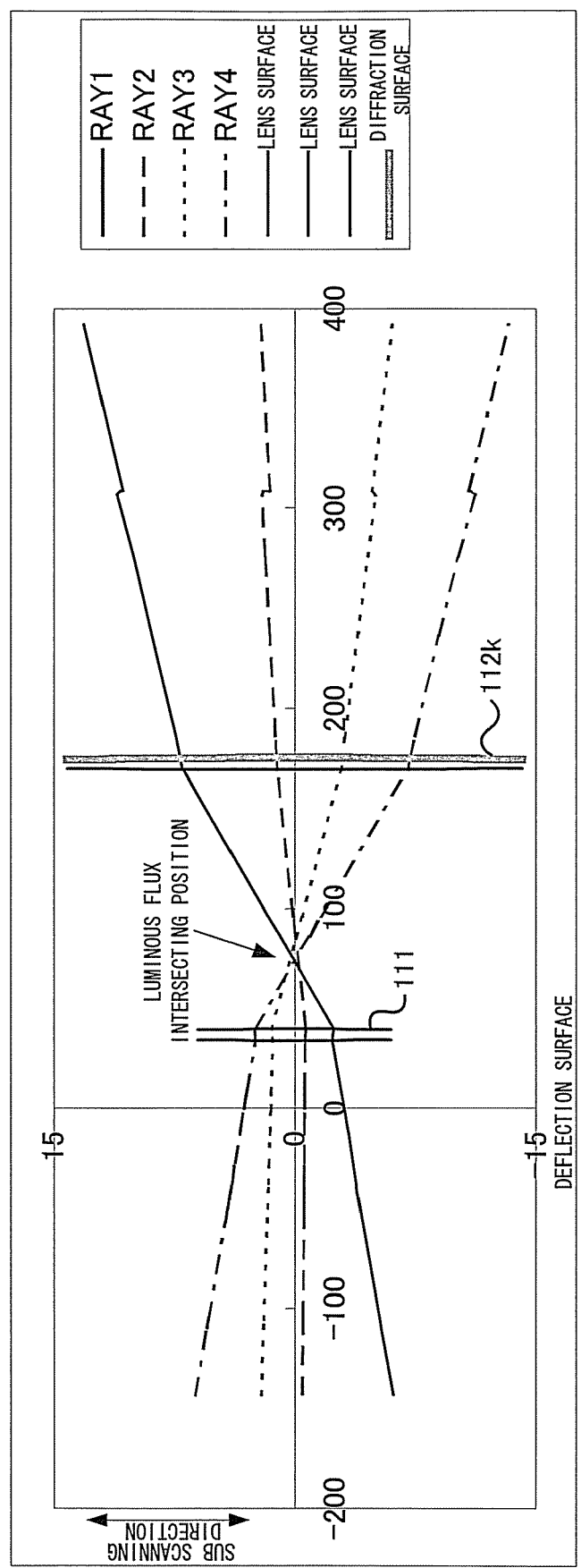
FIG. 22 is a view showing a cross-section in the sub scanning direction of a principal ray of each of plural luminous fluxes exiting from plural light sources 71, an fθ1 lens, and an fθ2 lens with a diffraction grating surface added to its exit side, in Example 2.

FIG. 22 is a view showing a cross-section in the sub scanning direction of principal rays of RAY1, RAY2, RAY3 and RAY4, which are plural luminous fluxes exiting from the plural light sources 71, the fθ1 lens, and the fθ2 lens with the diffraction grating surface added to its exit side in Example 2 (the view enlarged in the sub scanning direction).

As shown in FIG. 23, it can be understood that the beam spacing between RAY1 (ray for Y) and RAY4 (ray for K) moves in the expanding direction by 11 μm with a temperature rise of 15 degrees. Since it moves in the direction to cancel the quantity of registration shift (7 μm/cos γ) in the case where the rays are not shifted, only a shift in color superimposition by 4 μm/cos γ occurs between yellow and black with the temperature rise of 15 degrees.

Moreover, the quantity of defocusing change in the main scanning direction is restrained substantially to zero (see FIG. 23). Also the quantity of defocusing change in the sub scanning direction at the time of temperature change is lower than in the configuration of a comparative example which will be described later.

As for the relation between RAY2 and RAY4, L=75×2=150 holds and the beam spacing moves by 2 μm into the direction to cancel the quantity of registration shift (5 μm/cos γ) in the case where the rays are not shifted. Thus, the shift is 3 μm/cos γ. Also for RAY3 and RAY4, L=75 holds and the beam spacing moves in the by 9 μm into the direction to cancel the quantity of registration shift (3 μm/cos γ) in the case where the rays are not shifted. Thus, the shift can be restrained to 6 μm/cos γ.

EXAMPLE 3

Next, Example 3 will be described.
In this example, two fθ lenses (fθ lens 111 and fθ lens 112) are included in the post-deflection optical system, and the function of the diffractive optics is added to the exit surface 112k of the fθ lens 112 situated on the image surface side.

Here, the design wavelength of the diffractive optics added to the exit surface of the fθ lens 112 is 780 nm and the material of the lens is COP (cyclo-olefin polymer).

Also, the pre-deflection optical system in this example has the optical device 79 which is arranged at the most downstream position between the light source 71 and the reflection surface of the polygon mirror 80 in the traveling direction of luminous fluxes, and which has negative power in the sub scanning direction. The optical device 79 in this case is of the same material as the optical device forming the post-deflection optical system.

FIG. 24 is a view showing optical design data of each optical device in the Example 3. FIG. 25 is a data table showing paraxial power of each optical device in Example 3.

A part of these optical components area arranged with eccentricity and tilt (see FIG. 26). Eccentricity and tilt are provided on the first surface shown in FIG. 26. Thus, in the optical device 79, the height and angle of incidence of a ray in each sub scanning direction differs.

Utilizing the difference in refractive power, the rate of change of refractive power at the time of temperature change and the change in wavelength of the LD at the time of temperature change in the diffractive optics of the post-deflection optical system, due to this difference in height and angle of incidence, optimum power arrangement is made. Thus, defocusing is prevented from being largely changed by the temperature change, and the quantity of change in the beam position in the sub scanning direction on the image surface is caused to have a predetermined value.

FIG. 27 is a data table of coefficient value. FIG. 28 is a view showing a coefficient table of optical path difference function.

Figure 29:
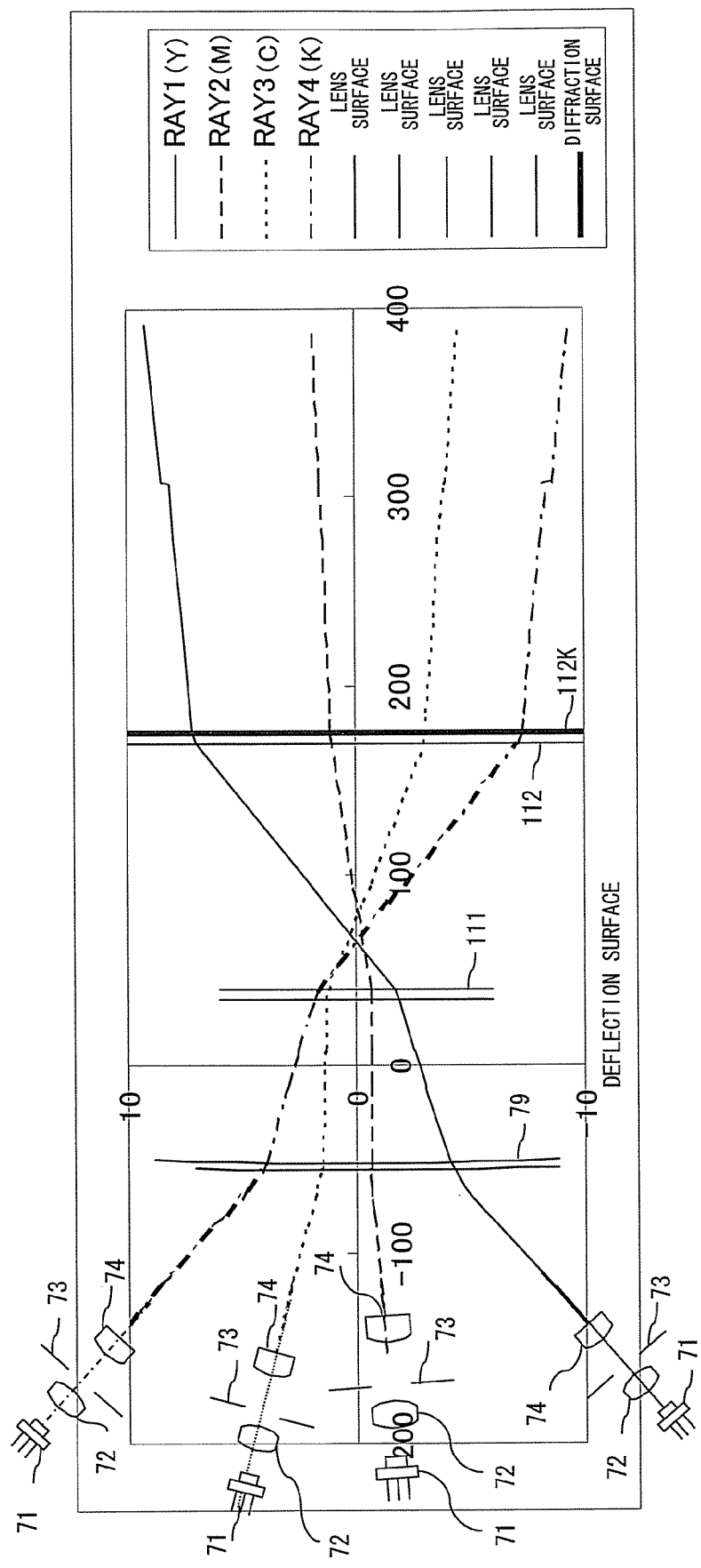
FIG. 29 is a view showing a cross-section in the sub scanning direction of a principal ray of each of RAY 1, RAY 2, RAY 3 and RAY 4, an optical device 79, an fθ1 lens, and an fθ2 lens with a diffractive optics added to its exit surface, in Example 3.

FIG. 29 is a view showing a cross-section in the sub scanning direction of principal rays of RAY1, RAY2, RAY3 and RAY4, which are plural luminous fluxes exiting from the plural light sources 71, the optical device 79, the fθ1 lens, and the fθ2 lens with the diffractive optics added to its exit surface in Example 3 (the view enlarged in the sub scanning direction). As can be seen from FIG. 29, in the post-deflection optical system in Example 3, the luminous fluxes reflected and deflected by the plural reflection surfaces of the polygon mirror 80 are caused to intersect each other in the sub scanning direction between the fθ1 lens 111 and the fθ2 lens 112.

FIG. 30 is a view showing the quantity of beam change at the time of temperature rise in Example 3. As shown in FIG. 30, it can be understood that the beam spacing between RAY1 (ray for Y) and RAY4 (ray for K) moves in the narrowing direction by 22 μm with a temperature rise of 15 degrees. Since it moves in the direction to cancel the quantity of registration shift (24 μm/cos γ) in the case where the rays are not shifted, only a shift in color superimposition by 2 μm/cos γ occurs between yellow and black with the temperature rise of 15 degrees.

Moreover, the quantity of defocusing change in the main scanning direction and in the sub scanning direction is restrained to 0.2 or less (see FIG. 30).

As for the relation between RAY2 and RAY4, L=75× 2=150 holds and the beam spacing moves by 13 μm into the direction to cancel the quantity of registration shift (16 μm/cos γ) in the case where the rays are not shifted. Thus, the shift is 3 μm/cos γ. Also for RAY3 and RAY4, L=75 holds and the beam spacing moves in the by 9 μm into the direction to cancel the quantity of registration shift (8 μm/cos γ) in the case where the rays are not shifted. Thus, the shift can be restrained to 1 μm/cos γ.

EXAMPLE 4

Next, Example 4 will be described.

In this example, two fθ lenses (fθ lenses 111 and 112) are included in the post-deflection optical system, and the function of the diffractive optics is added to the exit surface 111k of the fθ lens 111 situated on the polygon mirror side.

The pre-deflection optical system in this example has the optical device 79 which is arranged at the most downstream position between the light source 71 and the reflection surface of the polygon mirror 80 in the traveling direction of luminous fluxes, and which has negative power in the sub scanning direction. The optical device 79 in this case is of the same material as the optical device forming the post-deflection optical system.

Figure 34:
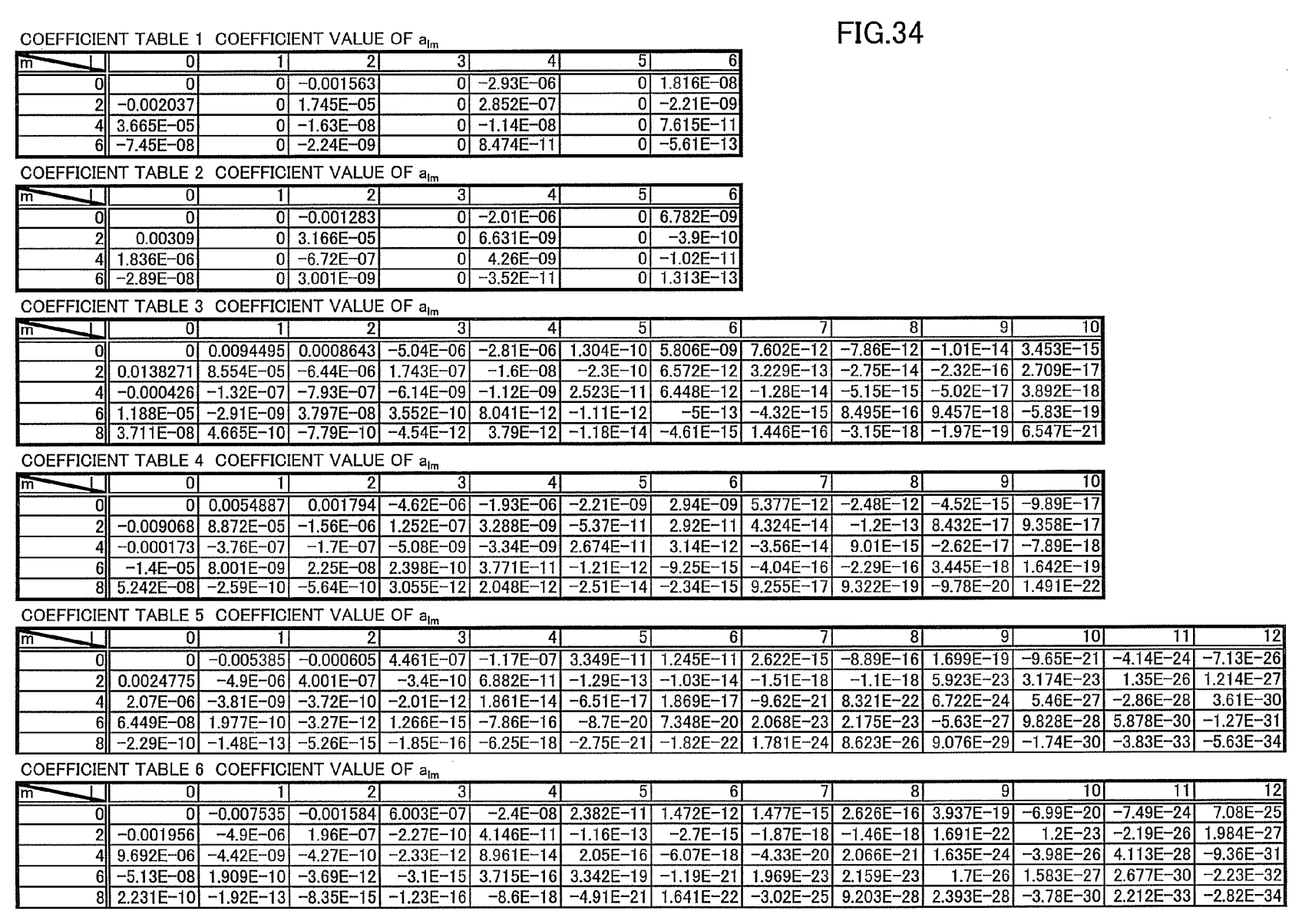

FIG. 31 is a view showing optical design data of each optical device in Example 4. FIG. 32 is a data table showing paraxial power of each optical device in Example 4. FIG. 33 is a view showing the eccentricity and tilt applied to each optical device in Example 4. FIG. 34 is a data table of coefficient value. FIG. 35 is a view showing a coefficient table of optical path difference function.

In the case where

Material of optical system housing: carbon fiber-reinforced polycarbonate (coefficient of linear expansion $\alpha_H=2.25\times 10^{-5}$)

Material prescribing the spacing between photoconductors: cold-rolled steel sheet: SPCC (coefficient of linear expansion $\alpha_F=1.2\times 10^{-5}$)

Material of transfer belt driving shaft: low-carbon steel (coefficient of linear expansion $\alpha_S=1.15\times 10^{-5}$)

Spacing between rays incident on photoconductors at both ends (photoconductor 401k and photoconductor 401y): L=225 mm Temperature rise: t=15 degrees are given, an ideal quantity of change in the distance between beams at both ends in the sub scanning direction is defined as $$-(\alpha_H - 2\times\alpha_F + \alpha_S)\times(L\times t) + \alpha_H \times LB \times t = -0.034 + 0.005 = -0.029 \quad (25).$$

(This means that in the case where a temperature change occurs and the position of rays in the sub scanning direction is not shifted at all, a shift in color superimposition by 29 μm/cos γ occurs.)

Figure 36:
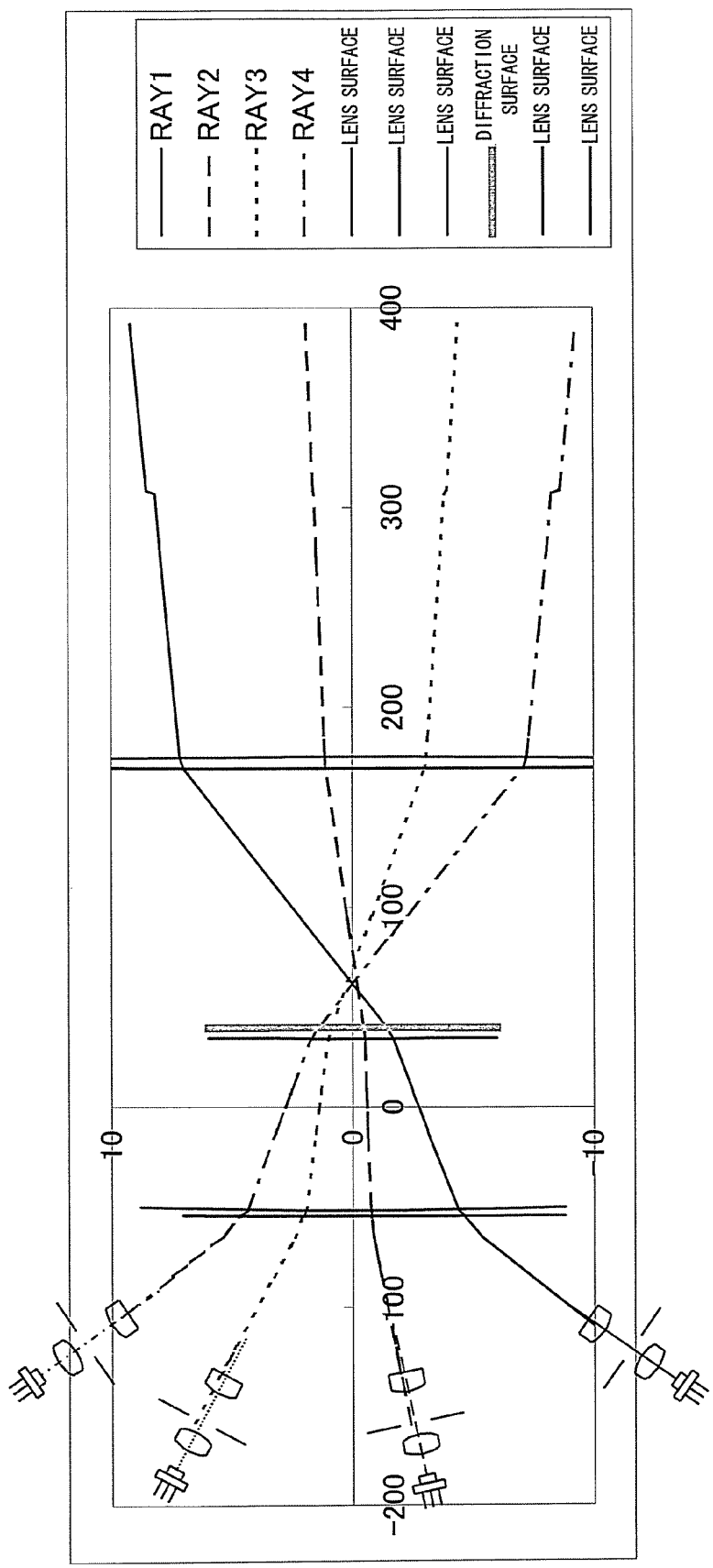
FIG. 36 is a view showing a cross-section in the sub scanning direction of a principal ray of each of RAY 1, RAY 2, RAY 3 and RAY 4, an optical device 79, an fθ1 lens 111 with a diffractive optics added thereto, and an fθ2 lens 112, in Example 4.

FIG. 36 is a view showing a cross-section in the sub scanning direction of principal rays of RAY1, RAY2, RAY3 and RAY4, which are plural luminous fluxes exiting from the plural light sources 71, the optical device 79, the fθ1 lens 111 with the diffractive optics added thereto, and the fθ2 lens 112 in Example 4 (the view enlarged in the sub scanning direction). As can be seen from FIG. 36, in the post-deflection optical system in Example 4, the luminous fluxes reflected and deflected by the plural reflection surfaces of the polygon mirror 80 are caused to intersect each other in the sub scanning direction between the fθ1 lens 111 and the fθ2 lens 112.

FIG. 37 is a view showing the quantity of beam change at the time of temperature rise in Example 4. As shown in FIG. 37, it can be understood that the beam spacing between RAY1 (ray for Y) and RAY4 (ray for K) moves in the decreasing direction by 28 μm with a temperature rise of 15 degrees. Since it moves in the direction to cancel the quantity of registration shift (29 μm/cos γ) in the case where the rays are not shifted, only a shift in color superimposition by 1 μm/cos γ occurs between yellow and black with the temperature rise of 15 degrees.

As for the relation between RAY2 and RAY4, L=75× 2=150 holds and the beam spacing moves by 18 μm into the direction to cancel the quantity of registration shift (19 μm/cos γ) in the case where the rays are not shifted. Thus, the shift is 1 μm/cos γ. Also for RAY3 and RAY4, L=75 holds and the beam spacing moves in the by 9 μm into the direction to cancel the quantity of registration shift (10 μm/cos γ) in the case where the rays are not shifted. Thus, the shift can be restrained to 1 μm/cos γ.

Moreover, the quantity of defocusing change in the main scanning direction is restrained to 0.1 and the quantity of defocusing change in the sub scanning direction is restrained to 0.3 or less (see FIG. 37).

COMPARATIVE EXAMPLE

A comparative example to compare the advantages of the above Examples 1 to 4 with the traditional optical beam scanning device will be described. In this comparative example, no diffractive optics is arranged in the post-deflection optical system. FIG. 38 is a view showing optical design data of each optical device in the comparative example. FIG. 39 is a data table showing paraxial power of a plastic lens arranged in the pre-deflection optical system in the comparative example. FIG. 40 is a data table showing the eccentricity and tilt of each optical device in the comparative example.

As shown in FIG. 41, RAY1 (ray for Y) and RAY4 (ray for black) move into the expanding direction by 90 μm with a temperature rise of 15 degrees. In the example where the combination of the materials forming the housing, the member prescribing the spacing between photoconductors and the transfer belt driving shaft in Example 1 is used, the rays shift by 90 μm with respect to the quantity of registration shift (38 μm/cos γ) in the case where the rays are not shifted. Therefore, a shift in color superimposition by 52 μm/cos γ occurs between yellow and black with the temperature rise of 15 degrees.

Moreover, it can be understood from FIG. 41 that the quantity of defocusing change in the main scanning direction and in the sub scanning direction is larger than in the above Examples 1, 2, 3, and 4.

Figure 42:
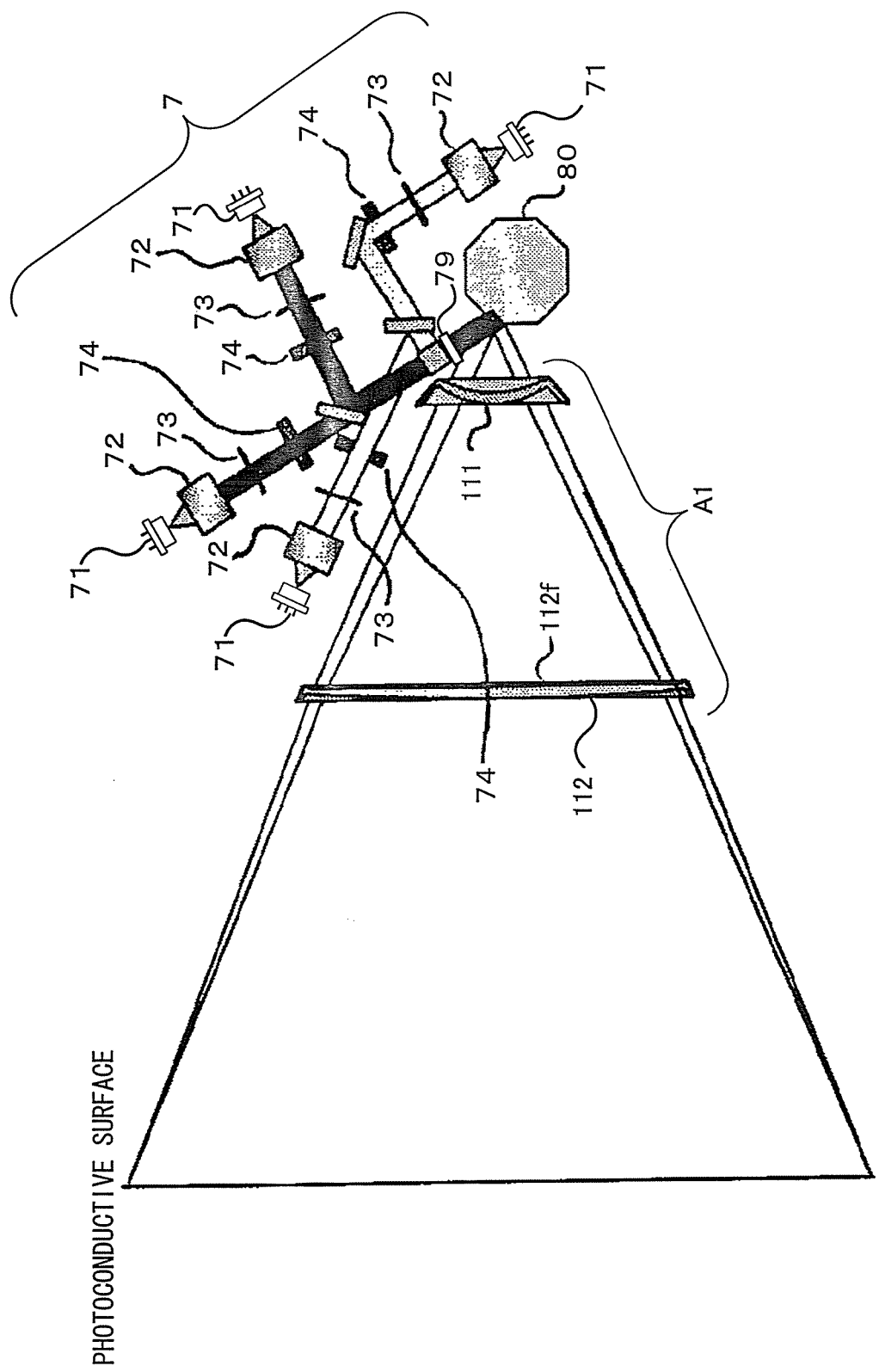
FIG. 42 is a view showing an example in which a diffraction grating is formed on an incident surface 112f of an fθ2 lens 112 in an optical beam scanning device having two fθ lenses.

FIG. 42 is a view showing an example in which a diffraction grating is formed on the incident surface 112$f$ of the fθ2 lens 112 in the optical beam scanning device having two fθ lenses.

Figure 43:
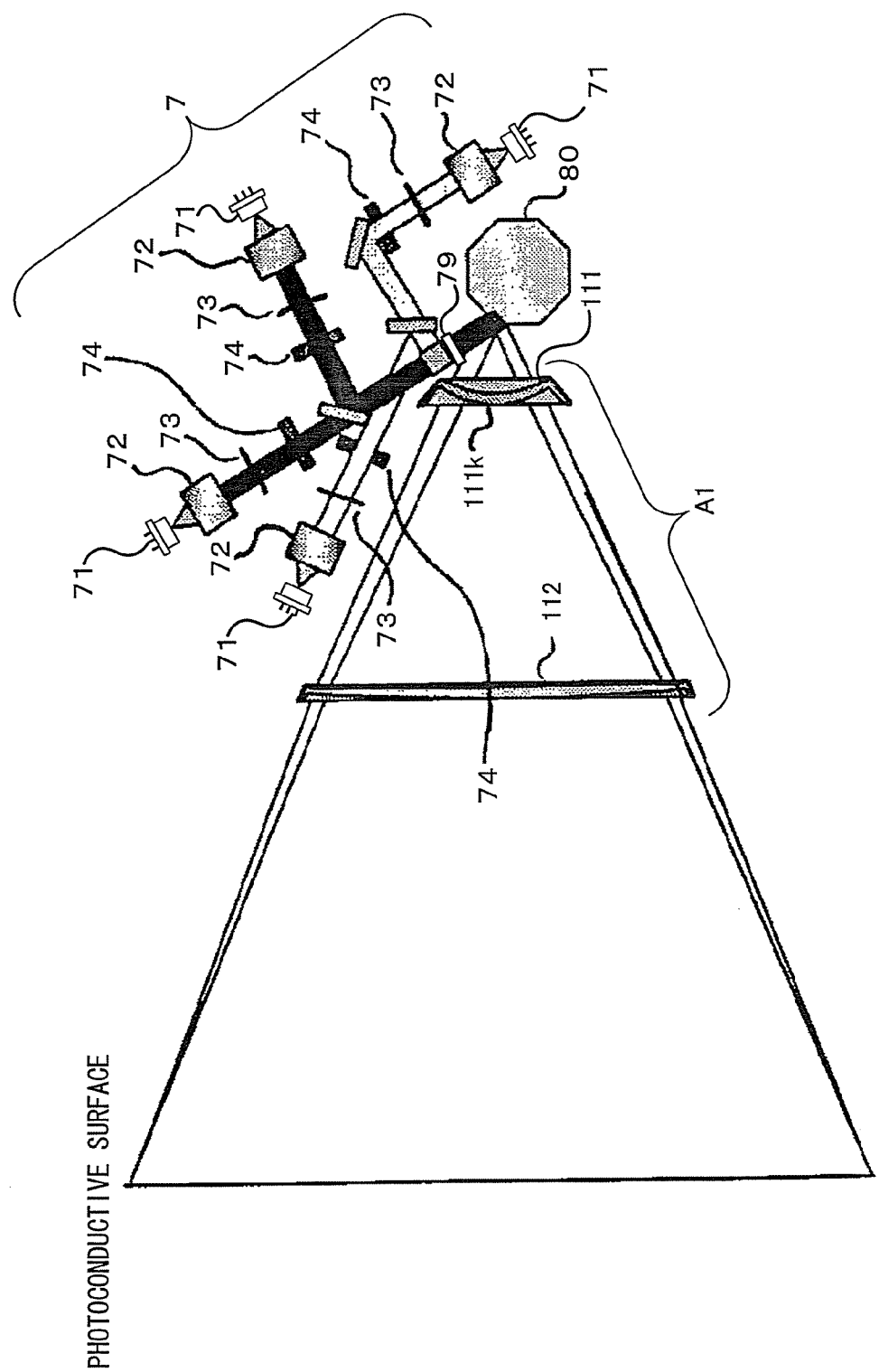
FIG. 43 is a view showing an example in which a diffraction grating is formed on an exit surface 111k of an fθ1 lens 111 in an optical beam scanning device having two fθ lenses.

FIG. 43 is a view showing an example in which a diffraction grating is formed on the exit surface 111$k$ of the fθ1 lens 111 in the optical beam scanning device having two fθ lenses.

Figure 44:
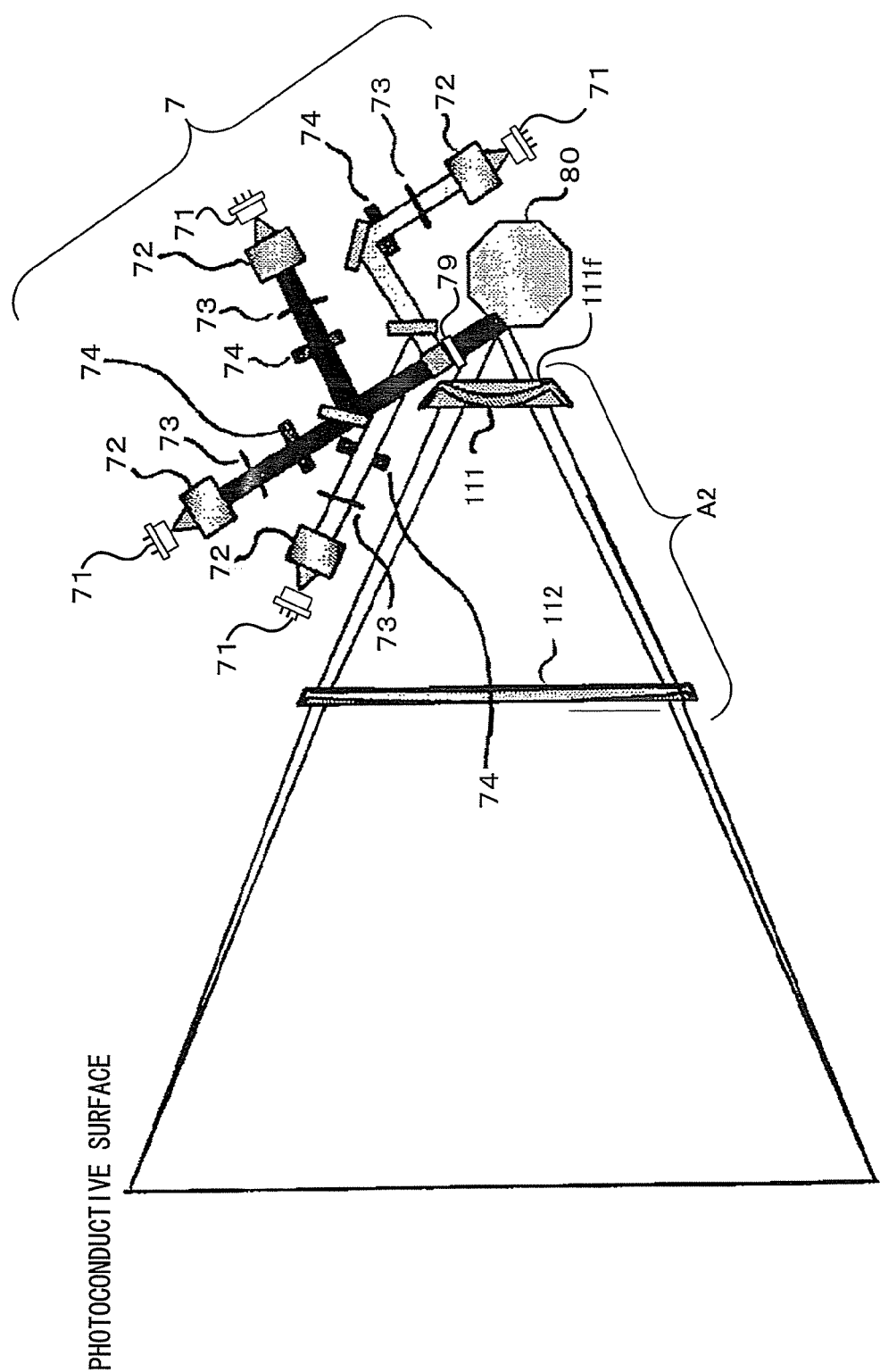
FIG. 44 is a view showing an example in which a diffraction grating is formed on an incident surface 111f of an fθ1 lens 111 in an optical beam scanning device having two fθ lenses.

FIG. 44 is a view showing an example in which a diffraction grating is formed on the incident surface 111$f$ of the fθ1 lens 111 in the optical beam scanning device having two fθ lenses.

Figure 45:
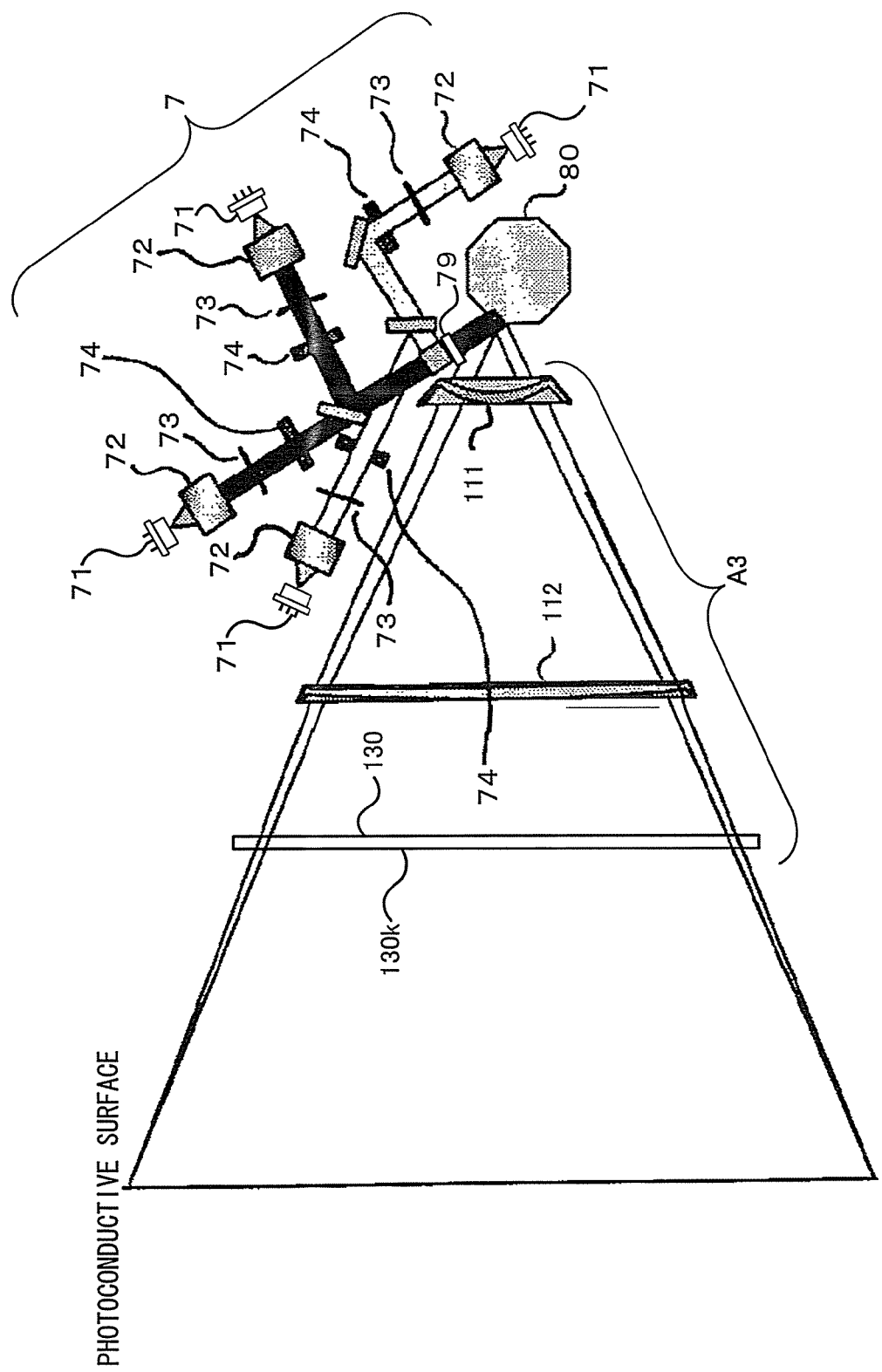
FIG. 45 is a view showing an example in which a plate-like optical device 130 is arranged toward the photoconductive surface side from an fθ2 lens 112 in an optical beam scanning device having two fθ lenses.

FIG. 45 is a view showing an example in which a plate-like optical device 130 is arranged toward the photoconductive surface side from the fθ2 lens 112 in the optical beam scanning device having two fθ lenses. In FIG. 45, a diffraction grating is formed on an exit surface 130$k$ of the plate-like optical device 130.

Figure 46:
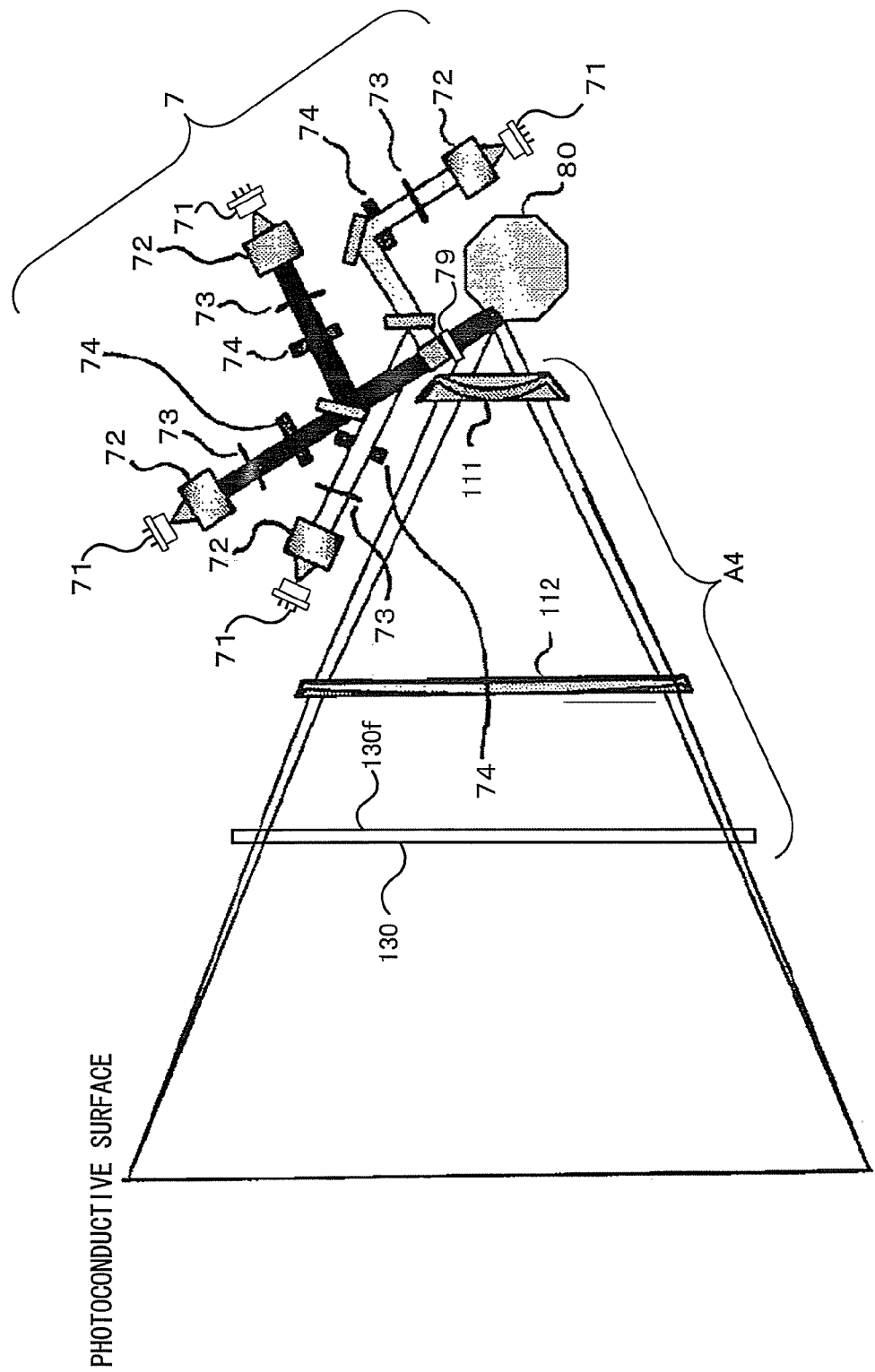
FIG. 46 is a view showing an example in which a plate-like optical device 130 is arranged toward the photoconductive surface side from an fθ2 lens 112 in an optical beam scanning device having two fθ lenses.

FIG. 46 is a view showing an example in which the plate-like optical device 130 is arranged toward the photoconductive surface side from the fθ2 lens 112 in the optical beam scanning device having two fθ lenses. In FIG. 46, a diffraction grating is formed on an incident surface 130$f$ of the plate-like optical device 130. The plate-like optical device 130 in FIG. 45 and FIG. 46 provides power to all the luminous fluxes that are reflected and deflected by the polygon mirror 80 and should be guided to the respective photoconductors.

Figure 47:
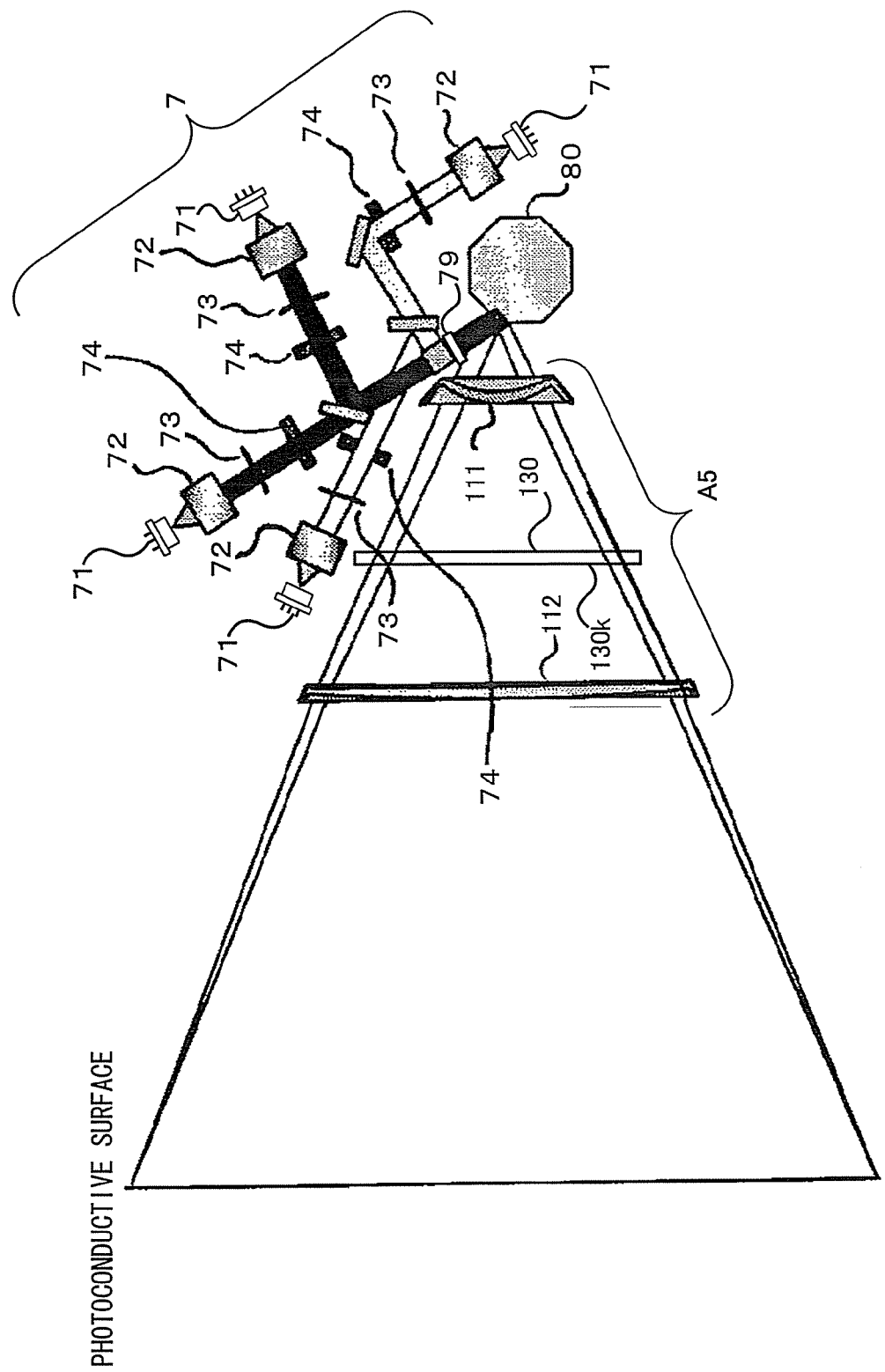
FIG. 47 is a view showing an example in which a plate-like optical device 130 is arranged between an fθ1 lens 111 and an fθ2 lens 112 in an optical beam scanning device having two fθ lenses.

FIG. 47 is a view showing an example in which the plate-like optical device 130 is arranged between the fθ1 lens 111 and the fθ2 lens 112 in the optical beam scanning device having two fθ lenses. In FIG. 47, a diffraction grating is formed on an exit surface 130$k$ of the plate-like optical device 130.

Figure 48:
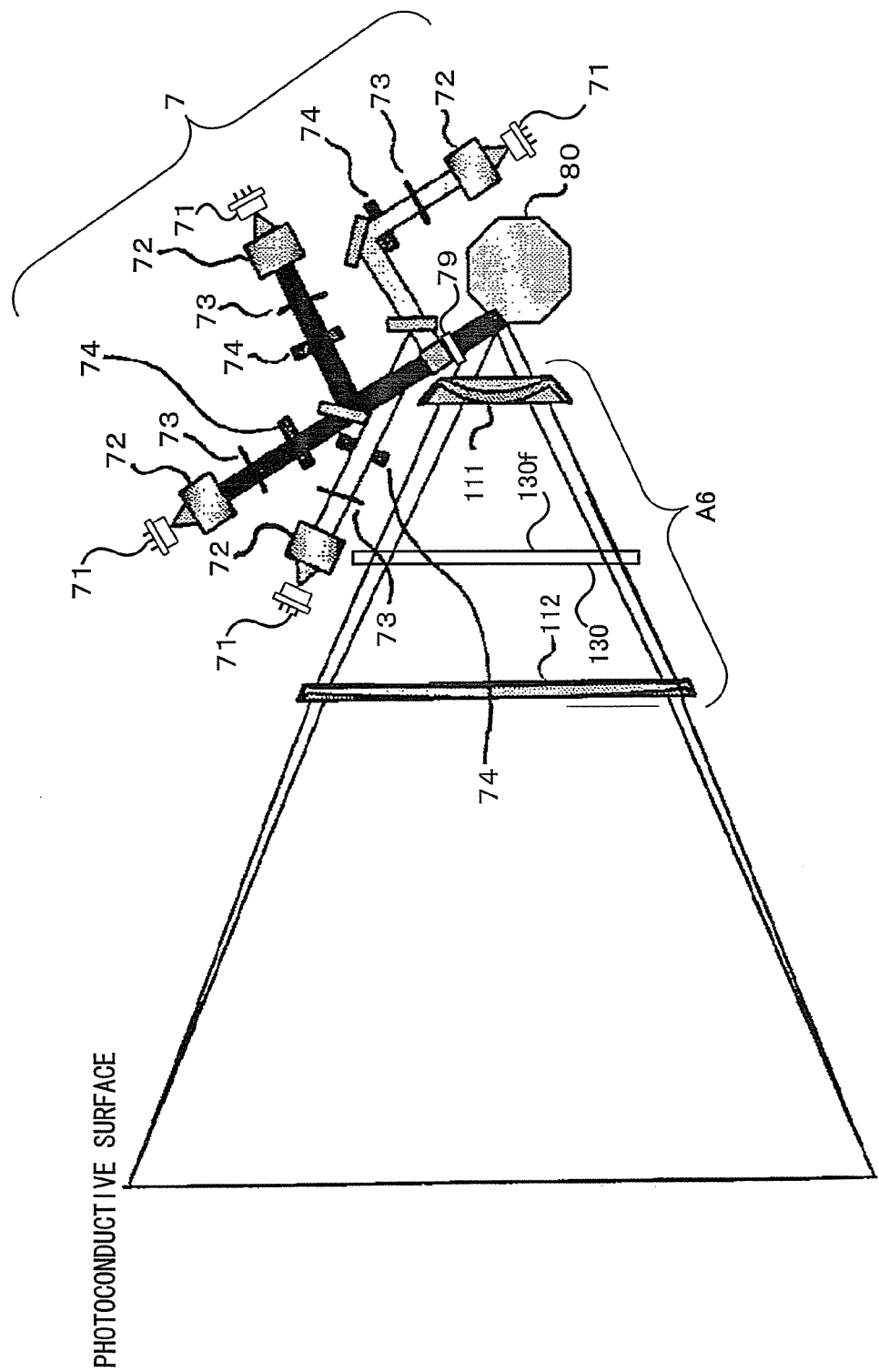
FIG. 48 is a view showing an example in which a plate-like optical device 130 is arranged between an fθ1 lens 111 and an fθ2 lens 112 in an optical beam scanning device having two fθ lenses.

FIG. 48 is a view showing an example in which the plate-like optical device 130 is arranged between the fθ1 lens 111 and the fθ2 lens 112 in the optical beam scanning device having two fθ lenses. In FIG. 48, a diffraction grating is formed on the incident surface 130$f$ of the plate-like optical device 130.

Figure 49:
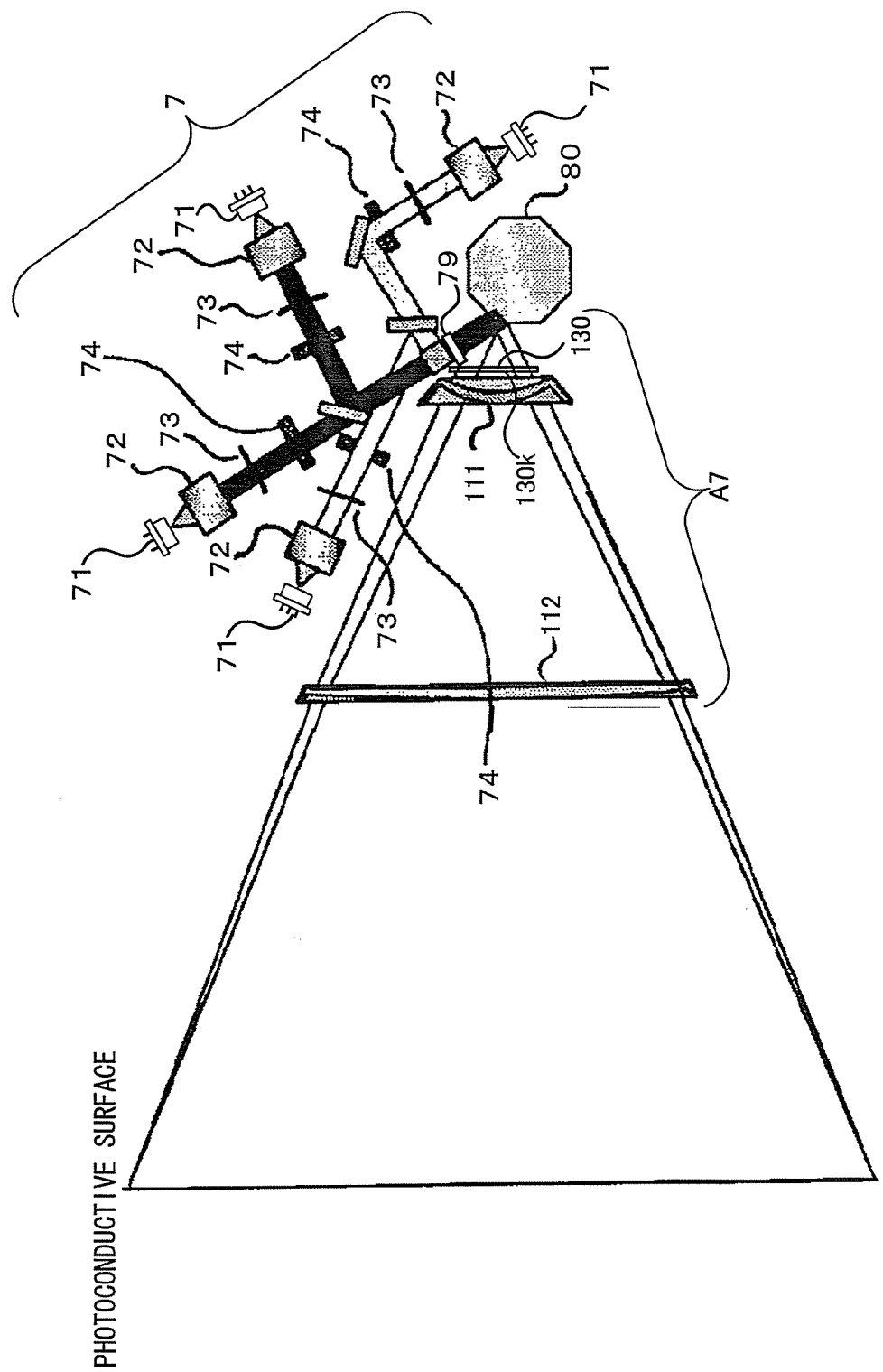
FIG. 49 is a view showing an example in which a plate-like optical device 130 is arranged between an fθ1 lens 111 and a polygon mirror 80 in an optical beam scanning device having two fθ lenses.

FIG. 49 is a view showing an example in which the plate-like optical device 130 is arranged between the fθ1 lens 111 and the polygon mirror 80 in the optical beam scanning device having two fθ lenses. In FIG. 49, a diffraction grating is formed on the exit surface 130$k$ of the plate-like optical device 130.

Figure 50:
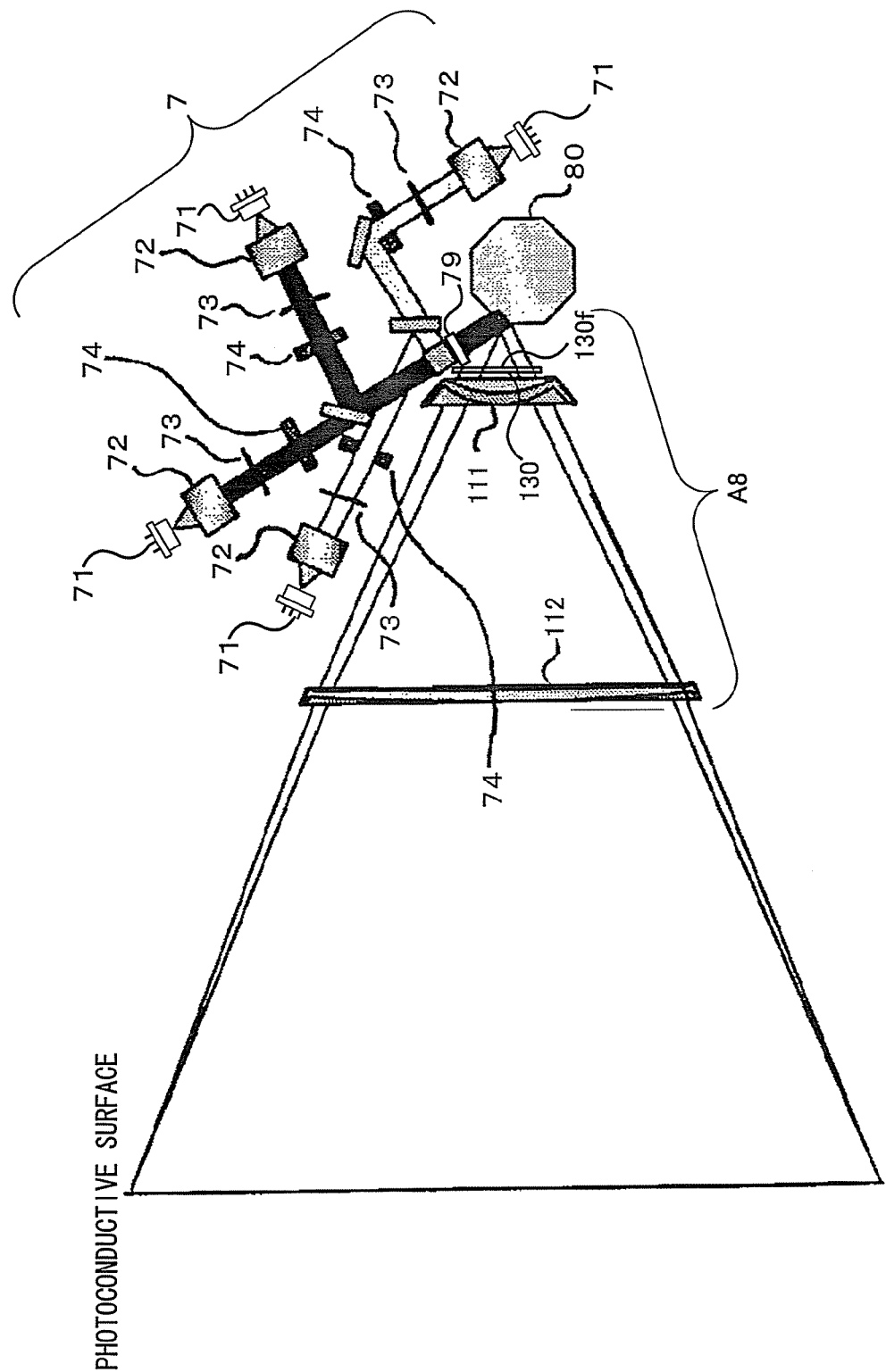
FIG. 50 is a view showing an example in which a plate-like optical device 130 is arranged between an fθ1 lens 111 and a polygon mirror 80 in an optical beam scanning device having two fθ lenses.

FIG. 50 is a view showing an example in which the plate-like optical device 130 is arranged between the fθ1 lens 111 and the polygon mirror 80 in the optical beam scanning device having two fθ lenses. In FIG. 50, a diffraction grating is formed on the incident surface 130$f$ of the plate-like optical device 130.

In the above examples, the example of the configuration with two fθ lenses as the shared optical device is mainly described. However, as a matter of course, it is possible to apply the configurations shown in FIG. 42 to FIG. 50 to an optical system having the configuration with one fθ lens as shown in FIG. 3 and FIG. 4.

In the above embodiment, the configuration in which one optical device having a diffraction grating formed therein is arranged for the optical path for one luminous flux, is described as an example. However, such optical device is not limited to this configuration. For example, as two optical devices having a diffraction grating formed therein are arranged on the optical path and a diffraction grating having power in the main scanning direction and a diffraction grating having power in the sub scanning direction are separately formed in these two optical devices, the degree of freedom in adjustment by the diffraction grating can be improved and it can contribute to improvement in optical performance.

Also, in a beam scanning optical system in which four optical units are individually arrayed, if the respective beam scanning optical systems can pass the optical paths of RAY1, RAY2, RAY3 and RAY4, as described in the above example, the similar advantage can be achieved.

Moreover, in an optical system unit in which two rays are guided from different directions to two surfaces of one polygon mirror having different angular positions and reflected light reflected by deflection surfaces on which these rays become incident is caused to scan in different direction, if the optical paths of the respective rays pass through optical paths similar to RAY1 and RAY2, as described in the example, the similar advantage can be achieved.

The present invention has been described in detail using the specific embodiment. However, it is apparent to those skilled in the art that various changes and modifications can be made without departing from the spirit and scope of the invention.

As described above in detail, according to the present invention, a technique can be provided which enables proper correction of optical characteristics in accordance with changes in ambient temperature.

What is claimed is:

1. An image forming apparatus, comprising:
an optical beam scanning device capable of causing a luminous flux from a light source to scan a photoconductive surface of each of plural photoconductors in a main scanning direction, the optical beam scanning device comprising:
a rotary deflector configured to reflect and deflect an incident luminous flux by plural reflection surfaces arrayed in a direction of rotation, and thereby cause the incident luminous flux to scan in the main scanning direction;
a post-deflection optical system including plural optical devices and configured to guide the luminous flux reflected and deflected by each of the plural reflection surfaces in the rotary deflector, to a photoconductive surface of a photoconductor to which the luminous flux should be guided, a diffraction grating being formed on the surface of at least one of plural optical devices; and
a housing that supports the plural optical devices;
plural photoconductors on which an electrostatic latent image is formed by a luminous flux caused to scan it by the optical beam scanning device;
a developing unit configured to develop the electrostatic latent image formed on the photoconductor;
a belt that contacts the plural photoconductors; and
a driving shaft that rotates the belt; and
when a coefficient of linear expansion of a material of the housing is $\alpha_H$, a coefficient of linear expansion of a material which prescribes spacing between the plural photoconductors is $\alpha_F$, a coefficient of linear expansion of a material of a shaft which drives the belt is $\alpha_S$, a spacing between two photoconductors situated at both ends of the plural photoconductors arranged along the belt is L, a beam spacing in a sub scanning direction of luminous fluxes which should be guided to the two respective photoconductors is LB, and a temperature rise is t, the plural optical devices forming the optical beam scanning device are set to have an optical characteristic such that a quantity of change in the beam spacing LB is $$-(\alpha_H - 2\times\alpha_F + \alpha_S)\times(L\times t) + \alpha_H \times LB \times t.$$

2. The optical beam scanning device according to claim 1, wherein of the plural optical devices forming the post-deflection optical system, in at least one optical device on which a principal ray of the luminous flux which should be guided to each of the plural photoconductors becomes incident at different incident positions from each other in a sub scanning direction orthogonal to the main scanning direction, a diffraction grating is formed at least on one of a plane of luminous flux incidence and a plane of luminous flux exit in the optical device.

3. An image forming apparatus comprising:
an optical beam scanning device according to claim 2;
a photoconductor on which an electrostatic latent image is formed by a luminous flux caused to scan it by the optical beam scanning device; and
a developing unit configured to develop the electrostatic latent image formed on the photoconductor.

4. The optical beam scanning device according to claim 1, wherein the optical device having the diffraction grating formed thereon is a shared optical device which provides positive power to a luminous flux which is reflected and deflected by the rotary deflector and which should be guided to each of the plural photoconductors, in accordance with an incident position of the luminous flux, so that the luminous flux guided to the photoconductive surface by the post-deflection optical system has a predetermined optical characteristic on the photoconductive surface.

5. The optical beam scanning device according to claim 4, wherein the post-deflection optical system has at least two of the shared optical devices.

6. The optical beam scanning device according to claim 1, wherein the post-deflection optical system has a plate-like optical device having a diffraction grating formed on at least one of its incident surface and exit surface, as the optical device having the diffraction grating formed thereon.

7. The optical beam scanning device according to claim 1, wherein the optical device having the diffraction grating formed thereon provides power to all the luminous fluxes that are reflected and deflected by the rotary deflector and that should be guided to each of the plural photoconductors.

8. The optical beam scanning device according to claim 1, wherein the optical device having the diffraction grating formed thereon has its incident surface and exit surface formed as curved surfaces.

9. The optical beam scanning device according to claim 1, wherein the post-deflection optical system has at least two of the shared optical devices having positive power in the main scanning direction, and
a diffraction grating is formed at least on one surface of incident surface and exit surface of one optical device of the at least two shared optical devices.

10. The optical beam scanning device according to claim 1, wherein the post-deflection optical system causes luminous fluxes reflected and deflected by the respective plural reflection surfaces of the rotary deflector to intersect each other in the sub scanning direction between two of the at least two shared optical devices.

11. The optical beam scanning device according to claim 1, wherein of the plural optical devices forming the post-deflection optical system, in at least one optical device in which a principal ray of the luminous flux from the light source becomes incident at a different incident position from an optical path of an optical axis of the post-deflection optical system in a sub scanning direction orthogonal to the main scanning direction, a diffraction grating is formed at least on one of a plane of luminous flux incidence and a plane of luminous flux exit in the optical device.

12. The optical beam scanning device according to claim 11, wherein the optical device having the diffraction grating formed thereon is a shared optical device which provides positive power to a luminous flux which is reflected and deflected by the rotary deflector and which should be guided to each of the plural photoconductors, in accordance with an incident position of the luminous flux, so that the luminous flux guided to the photoconductive surface by the post-deflection optical system has a predetermined optical characteristic on the photoconductive surface.

13. The optical beam scanning device according to claim 12 wherein the post-deflection optical system has at least two of the shared optical devices.

14. The optical beam scanning device according to claim 11, wherein the post-deflection optical system has a plate-like optical device having a diffraction grating formed on at least one of its incident surface and exit surface, as the optical device having the diffraction grating formed thereon.

15. The optical beam scanning device according to claim 11, wherein the optical device having the diffraction grating formed thereon provides power to all the luminous fluxes that are reflected and deflected by the rotary deflector and that should be guided to each of the plural photoconductors.

16. The optical beam scanning device according to claim 11, wherein the post-deflection optical system causes luminous fluxes which are reflected and deflected by the rotary deflector and which should be guided to the respective plural photoconductors to be incident on the diffraction grating at different positions from each other in the sub scanning direction.

17. The optical beam scanning device according to claim 11, wherein the optical device having the diffraction grating formed thereon has its incident surface and exit surface formed as curved surfaces.

18. The optical beam scanning device according to claim 11, wherein the post-deflection optical system causes luminous fluxes reflected and deflected by the respective plural reflection surfaces of the rotary deflector to intersect each other in the sub scanning direction between two of the at least two shared optical devices.

19. The optical beam scanning device according to claim 11, wherein the diffraction grating has power at least in one of the main scanning direction and the sub scanning direction.

20. The optical beam scanning device according to claim 1, wherein the diffraction grating has power at least in one of the main scanning direction and the sub scanning direction.

* * * * *